United States Patent
Zhang et al.

(10) Patent No.: US 11,762,943 B1
(45) Date of Patent: Sep. 19, 2023

(54) SYSTEMS AND METHODS FOR INTERACTIVE DISPLAY OF SYMBOLIC EQUATIONS EXTRACTED FROM GRAPHICAL MODELS

(71) Applicant: The MathWorks, Inc., Natick, MA (US)

(72) Inventors: Fu Zhang, Sherborn, MA (US); Murali K. Yeddanapudi, Lexington, MA (US); Pieter J. Mosterman, Framingham, MA (US); John E. Ciolfi, Wellesley, MA (US); Ebrahim Mehran Mestchian, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 622 days.

(21) Appl. No.: 15/716,112

(22) Filed: Sep. 26, 2017

Related U.S. Application Data

(60) Provisional application No. 62/400,264, filed on Sep. 27, 2016.

(51) Int. Cl.
  *G06F 17/11* (2006.01)
  *G06F 3/04842* (2022.01)
  *G06F 16/248* (2019.01)
  *G06F 16/332* (2019.01)

(52) U.S. Cl.
  CPC ............ *G06F 17/11* (2013.01); *G06F 3/04842* (2013.01); *G06F 16/248* (2019.01); *G06F 16/3328* (2019.01)

(58) Field of Classification Search
  None
  See application file for complete search history.

(56) References Cited

U.S. PATENT DOCUMENTS

| | | | | |
|---|---|---|---|---|
| 5,469,538 A * | 11/1995 | Razdow | ................ | G06F 17/10 345/440 |
| 5,526,475 A * | 6/1996 | Razdow | ................ | G06F 17/10 708/443 |
| 6,236,956 B1* | 5/2001 | Mantooth et al. | ........ | G06F 8/34 703/14 |
| 7,043,415 B1* | 5/2006 | Dunlavey et al. | ..... | G16C 20/80 703/12 |
| 8,832,668 B1* | 9/2014 | Hinkle et al. | ........ | G06F 9/45508 717/139 |
| 8,983,823 B1* | 3/2015 | Koh et al. | ................. | G06F 8/34 703/22 |
| 9,354,846 B2* | 5/2016 | Zhang et al. | ........ | G06F 17/5009 |
| 2004/0090439 A1* | 5/2004 | Dillner | .............. | G06K 9/00402 345/440 |

(Continued)

OTHER PUBLICATIONS

"Symbolic Math Toolbox™: User's Guide," R2016a, The MathWorks, Inc., Mar. 2016, pp. 1-1800.
"Simulink® User's Guide: R2017a," The MathWorks, Inc., Mar. 2017, pp. 1-3856.
Authors Unknown, function, The Authoritative Dictionary of IEEE Standards Terms, Seventh Edition, IEEE, Dec. 11, 2000, page 468 (Year: 2000).*

(Continued)

*Primary Examiner* — Bijan Mapar
(74) *Attorney, Agent, or Firm* — Cesari and McKenna, LLP

(57) ABSTRACT

A method and system automatically generates a display of symbolic equations from a graphical model (or vice versa) which is readable, parametric, and interactive.

25 Claims, 26 Drawing Sheets

(56) References Cited

U.S. PATENT DOCUMENTS

| | | | | |
|---|---|---|---|---|
| 2007/0255782 | A1* | 11/2007 | Tannenbaum et al. | G06F 9/4843 |
| | | | | 709/201 |
| 2009/0012754 | A1* | 1/2009 | Mosterman et al. ... | G06F 30/20 |
| | | | | 703/2 |
| 2009/0019099 | A1* | 1/2009 | Kunz et al. .......... | G06F 17/215 |
| | | | | 708/200 |
| 2009/0265685 | A1* | 10/2009 | Guenter ................ | G06F 17/10 |
| | | | | 717/106 |
| 2011/0107252 | A1* | 5/2011 | Balaram et al. ..... | G06F 30/367 |
| | | | | 715/773 |
| 2013/0116986 | A1* | 5/2013 | Zhang et al. .......... | G06F 30/20 |
| | | | | 703/2 |
| 2013/0198713 | A1* | 8/2013 | Zhang et al. .......... | G06F 17/13 |
| | | | | 717/106 |
| 2014/0214373 | A1* | 7/2014 | Jardin et al. ........... | G06F 17/13 |
| | | | | 703/2 |

OTHER PUBLICATIONS

Macey, Robert, George Oster, and Tim Zahnley. "Berkeley Madonna user's guide." University of California, Berkeley, CA (2000). 67 pages (Year: 2000).*

Meurer, Aaron, et al., "SymPy: symbolic computing in Python," PeerJ Computer Science, Jan. 02, 2017, pp. 1-27.

Wikipedia Contributors, "Operation (mathematics)," Wikipedia, The Free Encyclopedia, https://en.wikipedia.org/w/index.php?title=Operation_(mathematics)&oldid=1109792144 (accessed Sep. 12, 2022). 4 pages (Year: 2022).*

* cited by examiner

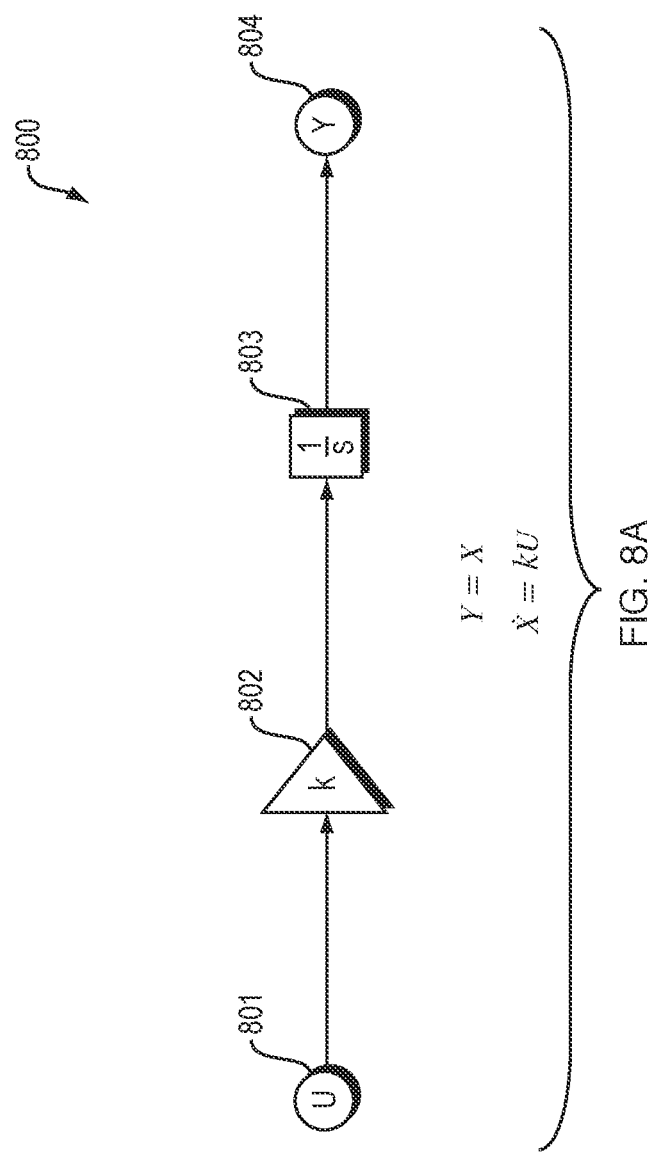

```
% Symbolic variables for block to use to describe their equation
syms U X U1 U2; }1602

% Integrator       ⎫
outInt (X) = X;    ⎬ 1603
derInt (U) = U;    ⎭

% sum
% sign determined by parameter of the block  }1604
outSum = -U1 + U2;

% Gain              ⎫
syms k; Parameter   ⎬ 1605
outMu (U, k) = k*U; ⎭

% Product
outProduct (U1, U2) = U1*U2; }1606

% Fcn
outFcn (U) = 1-U*U; }1607
```

(brace 1608 grouping the above)

```
% Model ("Root") level I/O variables }1610
syms X_1 X_2 Y_1 Y_2 X_1dot X_2dot;

% temp I/O variables                                                          ⎫
syms y_int1 u_fcn y_fcn u1_time y_time u_mu y_mu u_sum y_sum                  ⎬ 1611
u_int2 y_int2 u_int1                                                          ⎭
```

FIG. 16

```
%Strcat with LaTex format

X_1dot_text = strcat('$$', '\dot X_{1} =', latex(X_1dot), '$$');
X_2dot_text = strcat('$$', '\dot X_{2} =', latex(X_2dot), '$$');
Y1_text = strcat('$$', 'Y_{1} = ', latex(Y_1), '$$');
Y2_text = strcat('$$', 'Y_{2} = ', latex(Y_2), '$$');
```

FIG. 18A $$\dot{X}_1 = X_2 \quad \}\text{-1810}$$
$$\dot{X}_2 = -X_1 + kX_2(1 - X_1^2) \quad \}\text{-1850}$$
$$Y_1 = X_1$$
$$Y_2 = X_2$$

SYSTEMS AND METHODS FOR INTERACTIVE DISPLAY OF SYMBOLIC EQUATIONS EXTRACTED FROM GRAPHICAL MODELS

CROSS REFERENCE TO RELATED APPLICATIONS

The present application claims the benefit of U.S. Provisional Pat. Application Serial No. 62/400,264 filed Sep. 27, 2016 for INTERACTIVE DISPLAY OF SYMBOLIC EQUATIONS EXTRACTED FROM GRAPHICAL MODELS by Fu Zhang, Murali K. Yeddanapudi, Pieter J. Mosterman, John E. Ciolfi, and Ebrahim M. Mestchian, which application is hereby incorporated by reference in its entirety.

BRIEF DESCRIPTION OF THE DRAWINGS

The description below refers to the accompanying drawings, of which:

FIG. 8A is an example graphical model and symbolic equations;

FIG. 16 is an example code listing;

FIG. 18A is an example code listing to generate symbolic equations;

FIG. 18B is a resulting example symbolic equation display;

DETAILED DESCRIPTION OF ILLUSTRATIVE EMBODIMENTS

1. Introduction

Figure 1:
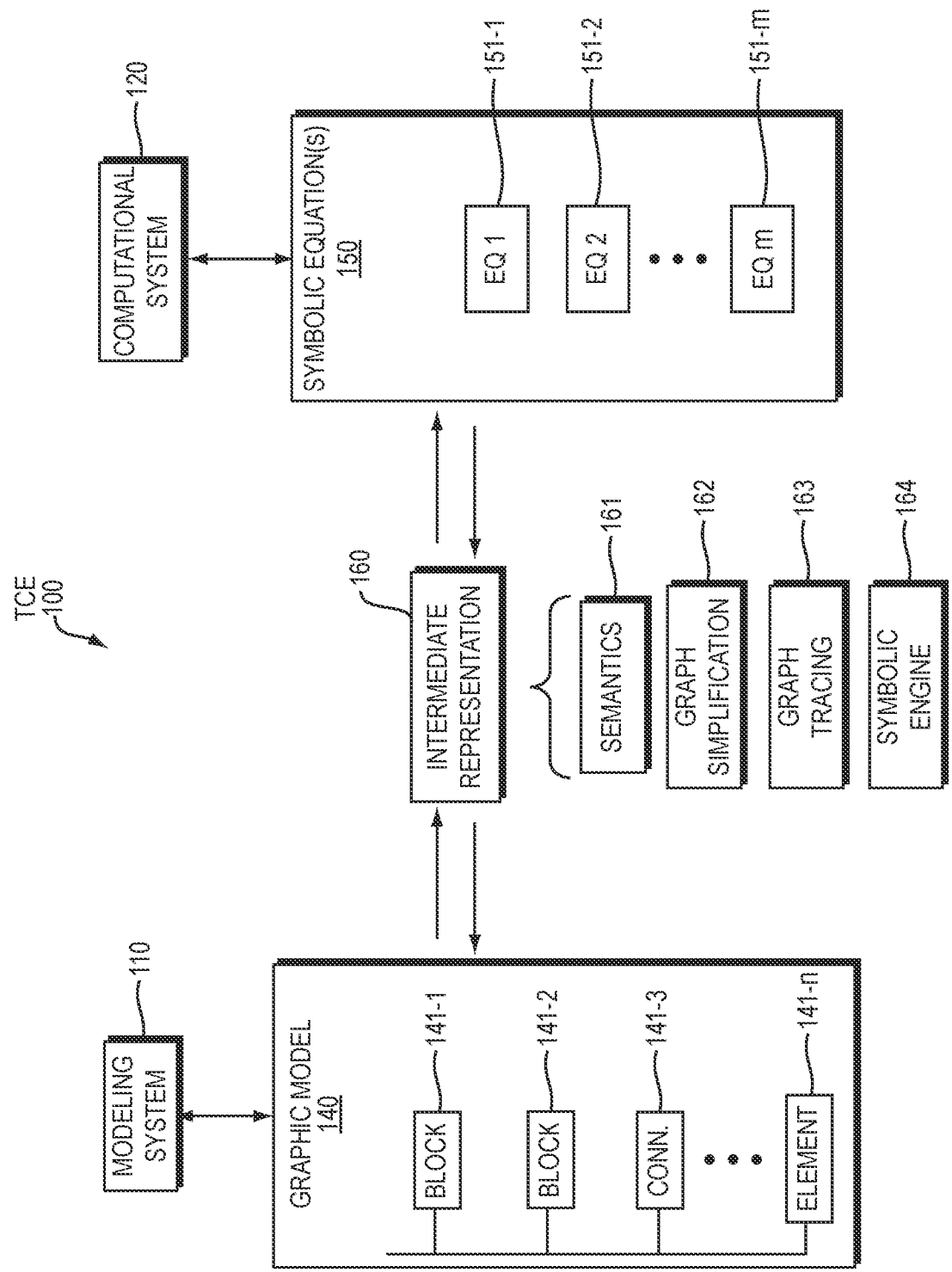
FIG. 1 shows an example modeling system and computational programming system.

This patent application describes systems and methods for generating interactive symbolic equations from a graphical model. The systems and methods leverage model-based tools that help users model, simulate, and/or analyze dynamic systems by representing the dynamic systems as graphical models. The graphical models may be block diagram models composed of a set of connected individual elements, such as icons or blocks, and connections between the elements. The model-based tools may be provided in the context of an interactive technical computing environment, and may allow a user to modify a model of the dynamic systems, for example by changing the elements or the connections between elements.

Models having many elements and/or many connections may pose challenges for developing the corresponding mathematical expressions that represent the underlying system. For example, an experienced engineer may desire to see one or more equations that represent the overall behavior of a complex system, or even just the equations that represent the behavior of a small portion of the complex system. These equations may be useful in further understanding the behavior of the system or its components. Conversely, other types of persons, such as college students, may be familiar with mathematical equations that represent a system. But these persons may have difficulty visualizing the equations represented by a model for even a simple system.

Example embodiments described herein provide computer-based tools that enable a user to generate a set of symbolic equations from a model. The tools may also enable a user who has specified a set of symbolic equations to generate a graphical model that corresponds to those equations.

In some implementations, the symbolic equations may be presented at the same time as a visual representation of the model. The symbolic equations may be presented in a way that is readable, parametric, and interactive. To be readable, the symbolic equations may, for example, include a minimum number of temporary variables, or only the temporary variables that the user has allowed. To be parametric, the visual presentation of the model may, for example, be parameterized to include defined variables and relationships between the variables; these parameters and annotations may then be carried through to the corresponding symbolic equations. To be interactive, for example, the user may change one or more attributes of at least one element of the model, and the systems and methods may then automatically update at least one symbolic equation. The elements in the model may comprise linear or nonlinear functional elements. However, it should be understood that the model may also include algorithmic or coded functions to be represented as one or more symbolic equations generated as the body of a function call, for example.

An intermediate representation, which may be stored in computer memory, may be generated from the model, or may be generated from the symbolic equations. The intermediate representation may include data structures that represent variables and relationships between the variables. These data structures may include one or more directed graphs having vertices that represent the variables and edges that represent relationships between the variables. In some embodiments, the intermediate representation may be simplified using graph reduction or other methods.

In some embodiments, the systems and methods may generate the symbolic equations from the intermediate representation. A simplified form of the intermediate representation may be generated before the symbolic equations are generated. Symbol substitution, temporary variable removal, and/or other techniques may be used in this simplification.

The interactive display of the model and symbolic equations may permit a user to select a portion of the model, and then automatically display the symbolic equations that correspond to that selected portion. The selected portion of the graphical model may be highlighted or displayed using a graphical affordance, such as a certain color, with the corresponding portion of the symbolic equation also being highlighted or displayed using that same graphical affordance, e.g., color.

Graphical affordances may also be used to indicate attributes of the graphical model that are reflected in corresponding parts of the equations. For example, when the model includes elements operating at different sample rates, a given color may be used in the display of the model to indicate those elements operating at one, e.g., a slow, rate, and another color to indicate those elements operating at another, e.g., a faster, rate. The same colors may be used to display corresponding symbols in the equations. In other embodiments, a first color may indicate a continuous time variable and a second color may indicate a discrete time variable. Graphical affordances, such as color or line width, may also be used to distinguish other attributes of variables, such as a dimension (vector or array) or data type (integer, double, floating, etc.).

In some embodiments, the symbolic equations may be further presented in a way that is readable, such as by re-inserting temporary variables for example to split long symbolic equations into two or more shorter symbolic equations.

Other features and characteristics of the present disclosure will become evident from the more detailed description that follows.

2. Intermediate Representation Linking a Model and Symbolic Equations

FIG. 1 illustrates an example Technical Computing Environment (TCE) 100. A modeling system 110 may include hardware and/or software based logic that helps users model, simulate, and/or analyze dynamic systems by representing these systems as executable graphical models 140. Other tools, such as a computational programming system 120, may include hardware and/or software based logic that allows users to perform tasks related to disciplines such as, but not limited to, mathematics, science, engineering, medicine, business, etc. The computational system 120 permits a user to perform tasks more efficiently than other types of computing environments, such as an environment that requires the user to develop code in a conventional programming language, such as C++, C, Fortran, Java, etc. In some implementations, the computational system 120 may include a dynamically typed language that can be used to express problems and/or solutions in mathematical notation.

Embodiments will be described below for illustrative purposes relative to the Simulink® modeling system 110 and the MATLAB® computational system 120, both available from The MathWorks, Inc. of Natick, Mass. Although the embodiments are described relative to these example systems 110 and 120, one of skill in the art will appreciate that the embodiments may be applied to other graphical modeling environments, to other computational programming environments, and to other technical computing environments.

The modeling system 110 may be used to generate a graphical model 140. The graphical model 140 may include data structures 141-1, 141-2..., 141-$n$ that define model elements and/or connections between model elements. Some of the model elements may be blocks 141-1, 141-2 that define functionality, behavior, logic, semantics, computations, and/or execution behavior via text, programming language diagrams, computer code, discrete event system specification (DEVS), hardware logic, etc. The model 140 may also include connection elements 141-3 that represent connections between model elements. Still other types of data structures 141-$n$ may be included in the model 140 to indicate other model elements and/or relationships between model elements. Model 140 may be hierarchical. For example, a portion of model 140 may itself be a block within a larger portion of model 140. Other attributes of the model 140 are described in more detail below.

The computational system 120 may be used to generate symbolic equations 150. The symbolic equations 150 may be represented as one or more data structures 151-1, 151-2 ... 151-$m$ that contain equations in symbolic form. It should be understood that there is not necessarily a direct one-to-one relationship between the number of model element data structures, n, and the number of equation data structures, m.

A relation may be maintained between the symbols and operators in the symbolic equations 150 and the corresponding model elements and connection elements in the graphical model 140. The relations between the graphical model 140 and symbolic equations 150 may be represented in a data structure referred to herein as an intermediate representation 160. The intermediate representation 160 may be generated from the graphical model 140 by the computational system 120. The intermediate representation 160 may also be accessible to the modeling system 110.

The relations maintained in the intermediate representation 160 may be bidirectional. For example, given an element in either the symbolic equations 150 or in the model 140, the corresponding element(s) of the either the model 140 or the symbolic equations 150 may be identified. A directed graph is one way to implement the intermediate representation 160.

As explained herein, the intermediate representation 160 may be developed by analyzing semantics of the individual elements 141 of model 140. The computational system 120 may include a number of tools that may be used to generate and maintain the intermediate representation 160 in this way. For example, a first such tool, element semantics 161, may extract semantic information from the model 140, such as the connection 141-3 between blocks, and may extract output methods, update methods, derivative methods, zero crossing methods and other semantics that define the behavior of the individual blocks 141-1, 141-2. A directed graph may then be constructed from these extracted semantics.

As explained herein, graph simplification 162 may be used to simplify the directed graph. Graph tracing 163 may be used to interpret the intermediate representation 160, and construct one or more representative symbolic equations 151. Symbolic engine 164 may be used to simplify the resulting set of symbolic equations 151.

In some embodiments, a tool such as the Simscape™ physical modeling tool, the Simulink S function API, or the functional mock-up interface (FMI) API may be used with human interaction to generate a graphical model 140 from the symbolic equation(s) 150, for example without first generating the intermediate representation 160.

3. Simultaneous, Interactive Display of a Model and Symbolic Equations

The systems and methods may automatically generate the symbolic equations 150 from the graphical model 140. The symbolic equations 150 and the graphical model 140 may also be displayed interactively. For example, when an input is obtained that indicates a change in one or more attributes of the graphical model 140, at least one updated symbolic equation 150 may then be automatically generated based on the changed attribute(s) of the graphical model 140. The visual representation of at least one symbolic equation 150 may then be also updated. In some implementations, it may be possible for this visual representation to be bidirectional, such that if the user updates an equation 150, the model 140 will be correspondingly changed.

Figure 2:
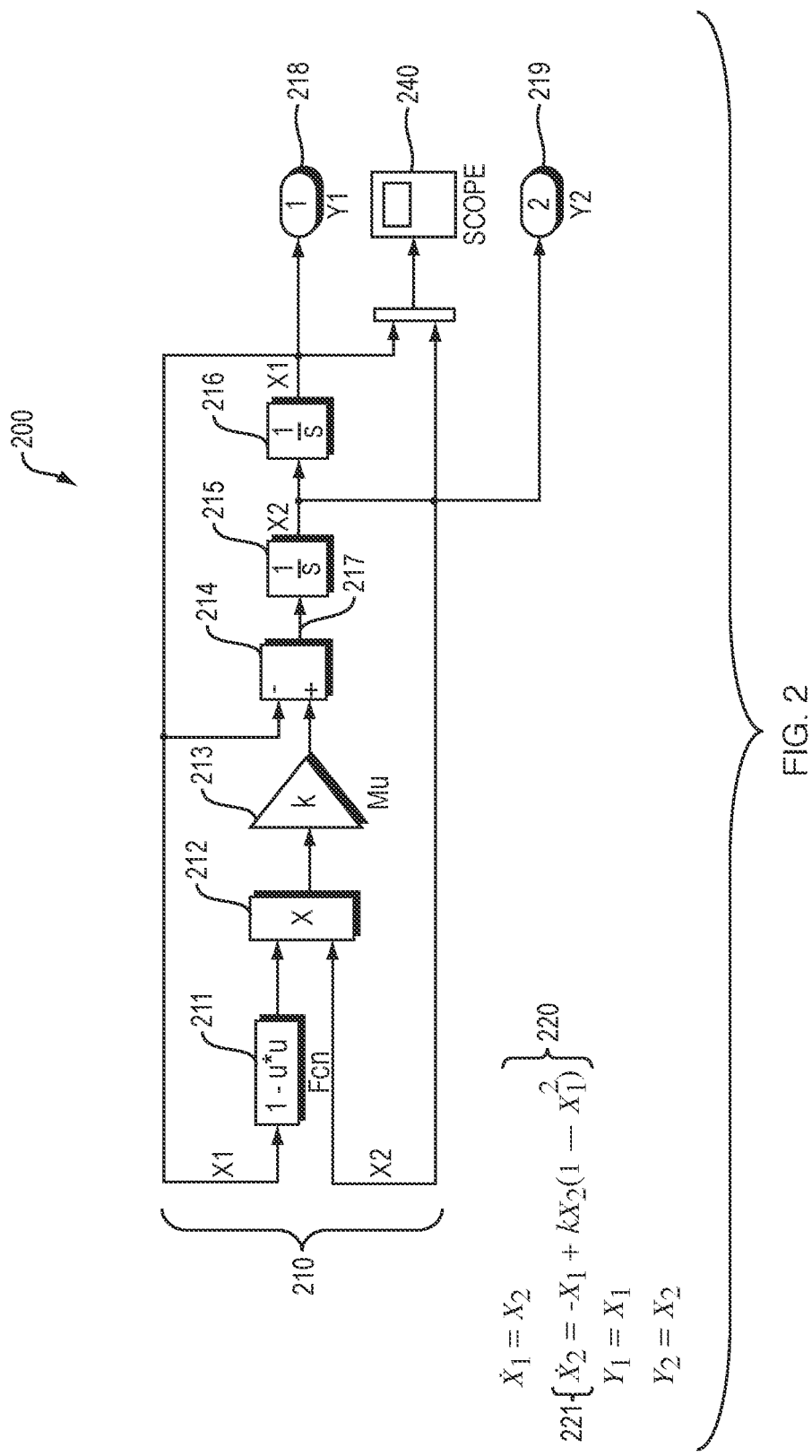
FIG. 2 is an example graphical model and corresponding symbolic equations.

FIG. 2 is an example of an interactive view 200 that may present a visual representation of a graphical model 210 at the same time as a visual representation of the corresponding symbolic equations 220 represented by the model 210. The model 210 may include a function block 211, a multiplier block 212, a gain block 213, a subtractor block 214, and a pair of integrator blocks 215 and 216. Data dependencies between blocks may be indicated by connection elements between blocks, such as an example connection 217 between an output of subtractor block 214 and an input of integrator block 215.

The model 210 may include a number of ports, including a first output 218 labeled $Y_1$ and a second output 219 labeled $Y_2$. Also shown is a scope block 240 to which the user has connected a pair of signals $x_1$ and $x_2$, so that the user may view the behavior of these signals, for example over time during execution of the model 210.

The symbolic equations 220 may appear within a certain area on a display screen, such as within the same window as a graphical depiction of the model 210. In other embodiments, the symbolic equations 220 and the model 210 may simultaneously appear in two areas of a display screen, such as within different tabs of the same window, in different windows, in different panes, etc.

Experienced users may sometimes be able to tell how the model 210 behaves by merely looking at the graphically depicted arrangement of the block elements and their connections. An experienced user may, for example, recognize the model 210 as a Van der Pol model. However, when such a diagram is shown to a less experienced person, such as a college engineering student, the student may have some difficulty understanding the behavior of the model 210. If the student views the corresponding symbolic equations 220 however, the student may recognize the equations as Van der Pol equations, and thus be able to understand the behavior of the graphical model 210. Thus, in some implementations, a user may develop a new model and/or retrieve a stored model and then request that a set of corresponding symbolic equations be generated.

As another example, experienced engineers may work with large, complex systems, and prefer to manipulate graphical models. These users may also benefit from a tool that can automatically generate the formal mathematics that describe the operation of the underlying complex system. The system and methods described herein may be used by both types of users to improve their understanding of the model 210, the symbolic equations 220, and how changes to one affect the other.

The display of the model 210 and the symbolic equations 220 may exhibit several other characteristics such as being readable, parametric, interactive, traceable, and/or sliceable.

By readable, the equations 220 may, for example, be presented so that they are in an algebraic format, using a reduced or a minimum number of equations. In the example of FIG. 2, despite there being six elements in the model 210, and despite some of the elements having multiple inputs and multiple outputs, only four symbolic equations 220 may be generated to characterize the model 210.

In another example, the set of equations $$y_1 = 2u$$

and $$y = 2y_1$$

may be considered to be less readable since they are not expressed using the minimum or a reduced number of temporary variables. This is because the equivalent relation can be represented by a single equation $$y = 4u$$

which eliminates the intermediate variable $y_1$.

In some embodiments, the relation may be equivalent, for example based on input and output variables. In other embodiments, equivalence may be based on input variables, output variables, and state variables. Also, a user may indicate which variables to retain in the reduced system of equations and so these user indicated variables may determine equivalence.

In other aspects, certain types of elements of the model 210 may be automatically excluded from the symbolic equations 220. For example, the scope element 240 may not itself generate a part of the symbolic equations 220. This may further assist with producing symbolic equations 220 that are readable. For example, one or more scope connections, for example input signals to a scope block, may be associated with the respective variables in the symbolic equation representation. Variables associated with scope connections may be removed before generating symbolic equations.

There may also be a mix of symbolic equations and graphical model elements displayed to the user. For example, a line may be shown connected to an edge of a bounding box of a variable symbol. In case of a directional connection, if the source of the direction is connected to the symbol, that may mean the value of the variable is shared with another element (graphical or symbolic).

The display of the model 210 and the symbolic equations 220 may also be parametric. For example, the same symbols and labels defined in the model 210 may appear in the symbolic equations 220, and vice versa. For example, one of the parameters in the model 210 is a parameter, k, defined by the user to specify an amount of amplification introduced by the gain block 213. This very same parameter, k, is also seen in the second equation 221 in the set of symbolic equations 220.

The modeling system 110 can also assign symbols or labels automatically for the user by, for example, labeling inputs according to a certain convention. One example convention may be for the modeling system 110 to automatically label system inputs, model inputs, or element inputs with the letter U followed by an index number, and automatically label system, model, or element outputs with the letter Y followed by an index number. These symbols may be carried forward to the symbolic equations 220. The user may also be permitted to apply special words or characters as labels to various parts of the model 210 manually. Since these manually added labels may provide further context or meaning to parts of the model, the systems and methods may automatically generate symbolic equations 220 that reflect these labels and symbols in the equations, regardless of how they are generated.

The view of the model 210 and the symbolic equations 220 may also be interactive, for example, if a user clicks on or highlights a portion of the symbolic equations 220, only the part(s) of the model 210 corresponding to the portion of the symbolic equations are highlighted or indicated with some graphical affordance. Similarly, if one or more parts of a model 210 are selected, then the systems and methods may similarly highlight or indicate corresponding parts of the symbolic equations 220 with a graphical affordance, for example, the same graphical affordance.

Figure 3:
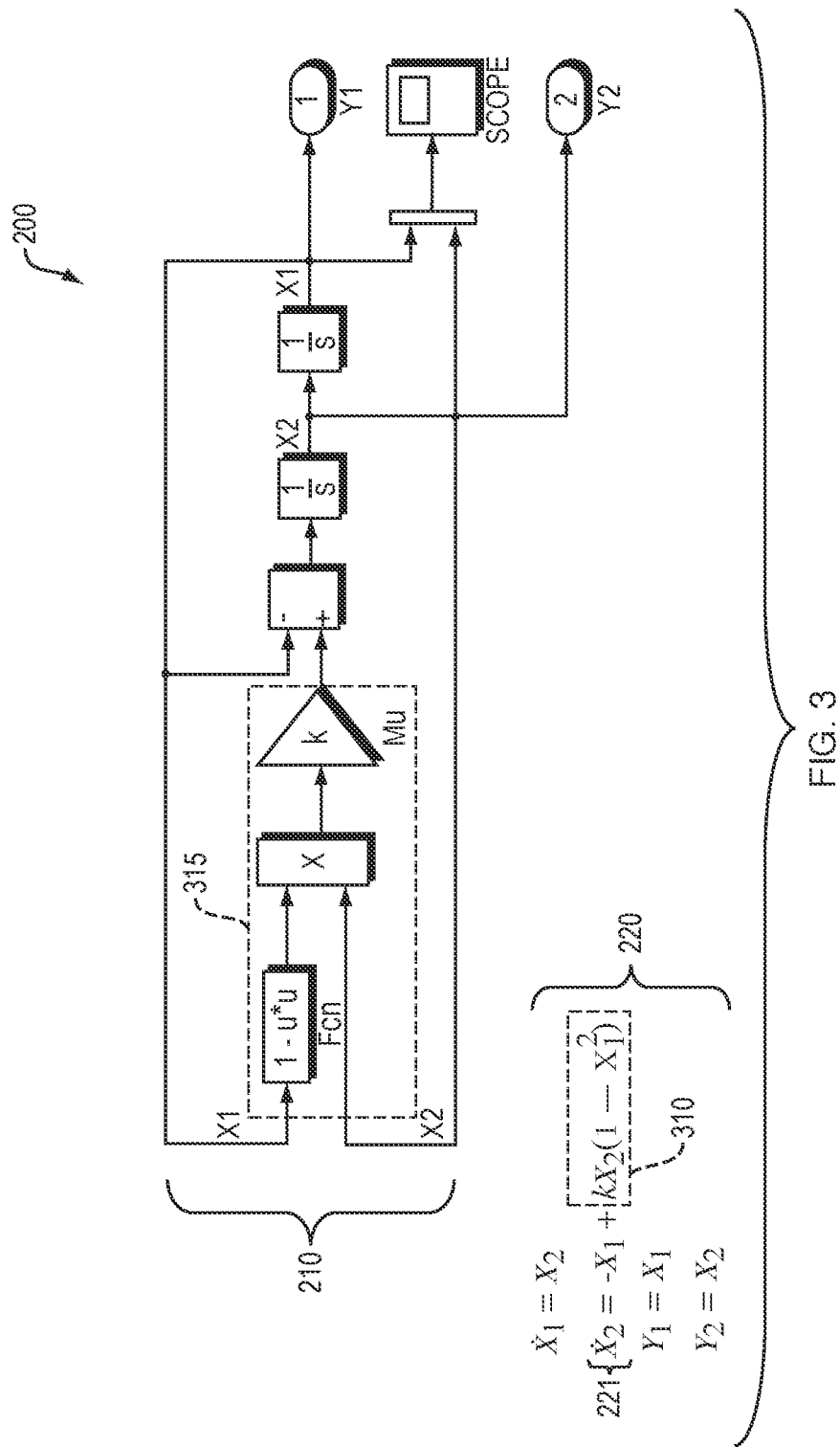
FIG. 3 is an example graphical model and corresponding symbolic equations.

Turning attention to the example of FIG. 3, if the user indicates a portion 310 of the second equation 221:

$$kX_2(1-X_1^2)$$

then only corresponding elements of the model 210 (those enclosed within the dotted lines 315) may be indicated by a graphical affordance. While in FIG. 3 the indicating is implemented as a dotted rectangular outline, indicating may be implemented by other graphical affordances, such as bolding, underlining, changing color, highlighting, lowlighting, line style changes, line attribute changes, drop shadow (or not), or in other ways that indicate a selected portion of the model and the corresponding equations or vice versa.

The display may also be interactive, for example, in the sense that deleting, adding, or changing elements of the model 210 also results in matching deletion(s), addition(s), or change(s) to the corresponding symbolic equations 220.

Figure 4:
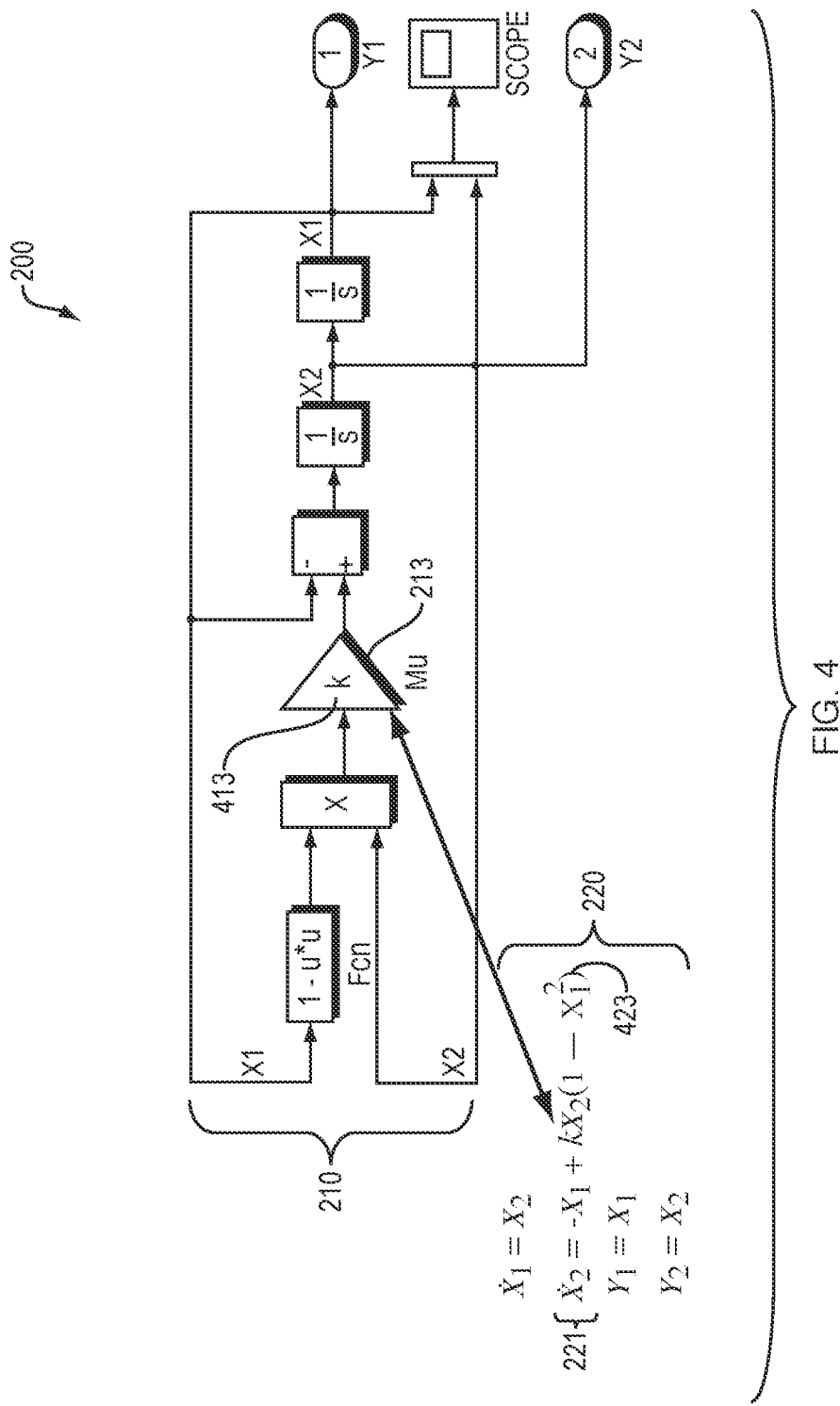
FIG. 4 is an example graphical model and corresponding symbolic equations.

The relationships between the model 210 and symbolic equations 220 may also be traceable. For example, individual variables, operators, and functions in the symbolic equations 220 may map back to a corresponding part of the model 210 and vice versa. As shown in FIG. 4, the user may select a parameter 413, such as a gain value k associated with the gain block 213, and a corresponding symbol 423 may be highlighted in the symbolic equations 220. The user may also select symbol 423 in the symbolic equations 220 and have the corresponding parameter(s) 413 highlighted in the model 210. In some implementations, if the particular model element is not presently in view, that portion of the model where the symbol is present may be brought into view. For example, the particular model element may be included in a subsystem, and the subsystem may be opened to bring the model element into view. Also, there may be multiple model portions that relate to one parameter in the symbolic equations. In that instance, multiple such portions of the model may be displayed, for example, side by side in a single pane, in different panes, in multiple tabs, or in other ways.

Figure 5:
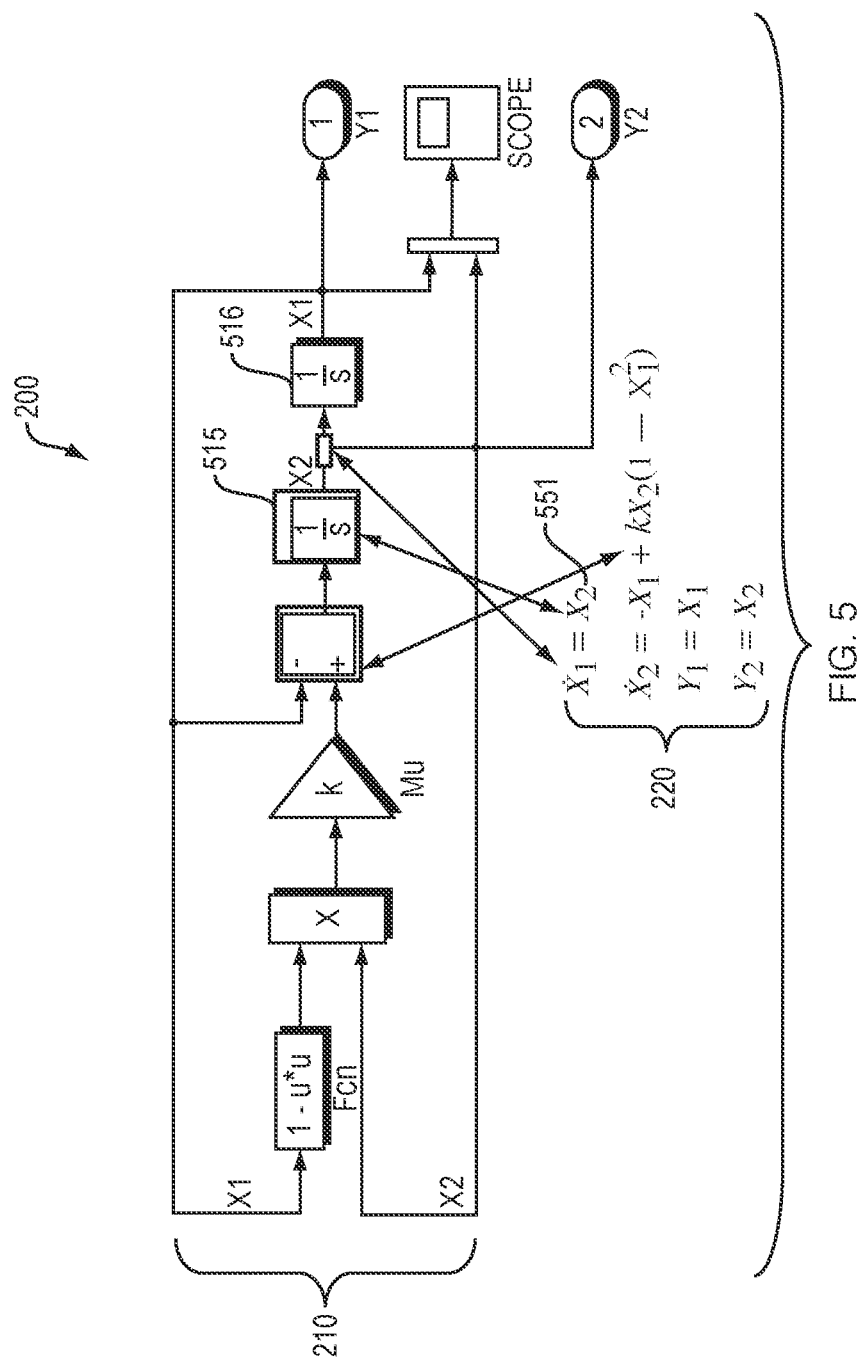
FIG. 5 is an example graphical model and corresponding symbolic equations.

This bi-directional traceability aspect permits the user to select an element(s) of the equations or an element(s) of the model and have the corresponding element of the model or equation accordingly highlighted. These relationships may also be presented using a graphical affordance, such as color or by highlighting, or in other ways. As the example of FIG. 5 shows, when the user clicks on an input to an integrator block 515 in the model 210, a corresponding quantity $\dot{x}_1$ may be highlighted in equations 551, for example, each in the same color, such as red. Similarly, clicking on $X_2$ in a first equation 551 may cause the integrator block 515, which generates $X_2$, to be highlighted in the graphical model 210.

If the user deletes or modifies a portion of the graphical model 210, a corresponding portion of the symbolic equations 220 may likewise be deleted or modified. Similarly, if the user deletes one of the variables or otherwise modifies the symbolic equations 220, that change in the equations may be reflected in the model 210.

Figure 6:
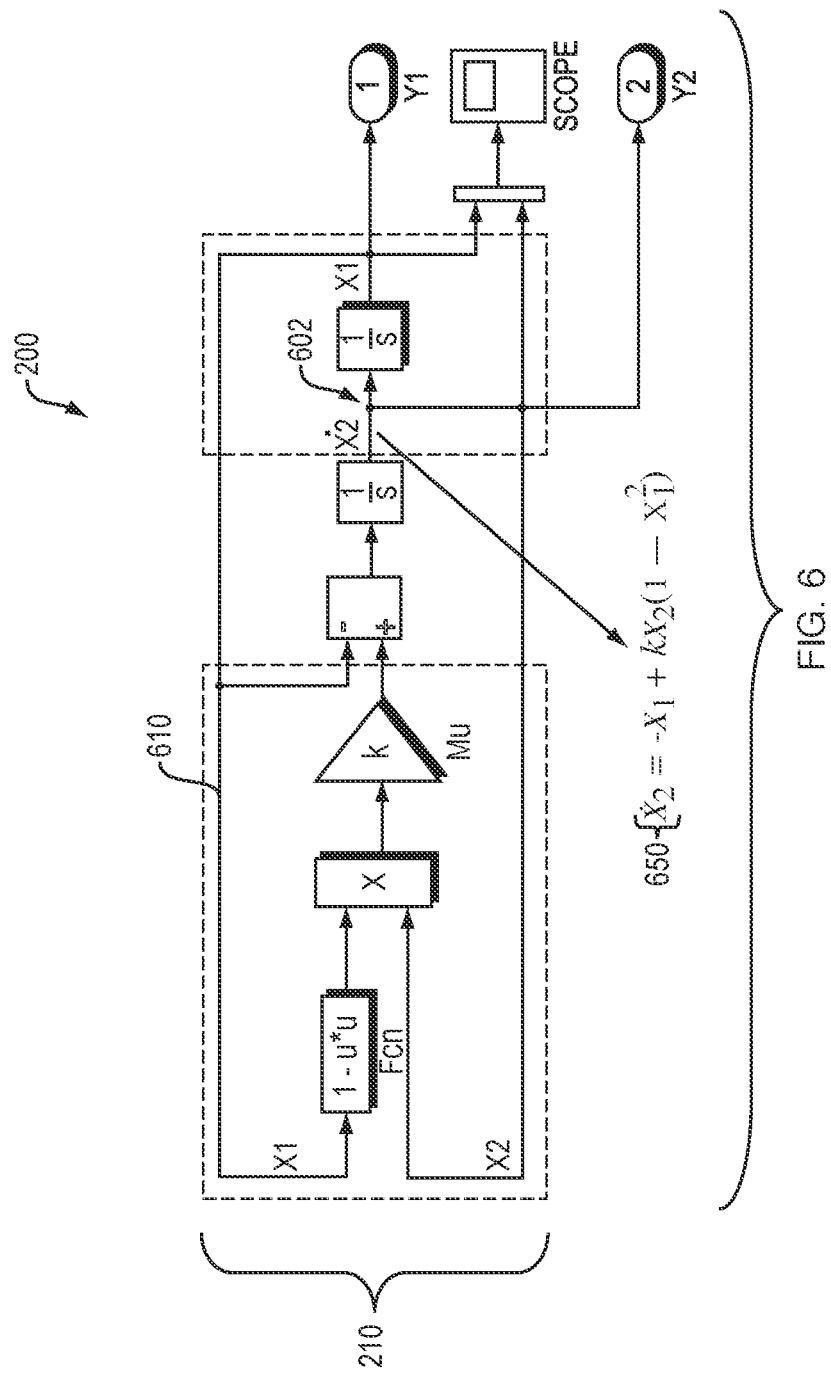
FIG. 6 is an example graphical model and corresponding symbolic equations.

The display of the model 210 and the symbolic equations 220 may also be sliceable. For example, a user may select a portion of the model 210, and request that symbolic equations representing only that selected portion of the model 210 be generated. As shown in FIG. 6, the user may use a mouse to hover over a terminal 602 in the model 210. In response, the system may slice the model. For example, the system may highlight a portion of the model 210 shown in bold (that is, the portion of the model that are shown enclosed in the dotted lines) that drives the terminal 602. The corresponding subset of equation(s) 650 for just the sliced part of the model may then be generated and displayed.

In another example, when a model includes elements operating at different sample rates, a given color may be used in the visual representation of the model to indicate those elements operating at one, e.g., a slow, rate, and another color to indicate those elements operating at another, e.g., a faster, rate. The same attributes may be propagated to corresponding symbols in the symbolic equations corresponding to the model. In other embodiments, a first color or other graphical affordance may indicate a continuous time variable and a second color may indicate a discrete time variable in the visual representation of the model. Other colors or other graphical affordances may indicate other attributes of variables such as a dimension (vector or array) or data type (integer, double, floating point, etc.). These attributes may also be propagated to the corresponding variables in the symbolic equations.

Figure 7:
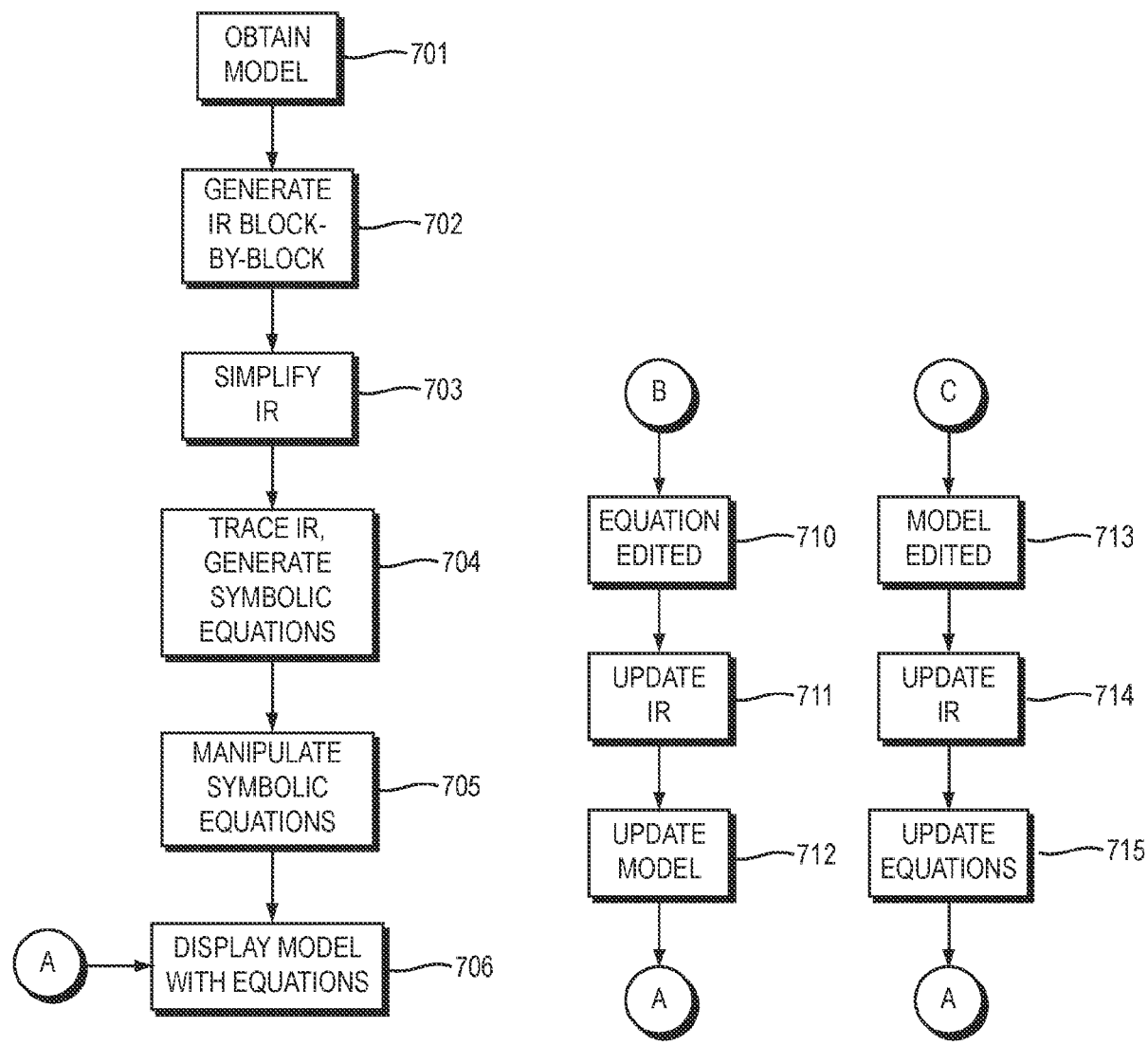
FIG. 7 is a flow diagram of an example method for simultaneous display of a graphical model and symbolic equations.

FIG. 7 illustrates an example process that may be performed to implement simultaneous and interactive display of a model and symbolic equations. In act 701, a model may be obtained for example using the element semantics 161. In act 702, an intermediate representation may be generated, such as in the form of a directed graph. In act 703, the intermediate representation may be simplified, such as by the graph simplification 162. In act 704, symbolic equations may then be generated from the intermediate representation. This act 704 may involve using graph tracing 163. In act 705, symbolic equations may be manipulated, such as simplified, reduced, converted to first-order differential equations, converted to filter forms, etc. using the symbolic engine 164. In act 706, the model may be displayed together with the simplified symbolic equations.

At some later time, such as after time B, a symbolic equation may be edited in act 710. In act 711, the intermediate representation may be updated. In act 712, an updated model may be generated. Processing may then return to state A where the updated model and symbolic equations may be displayed together.

At other times, such as after time C, the model may be edited in act 713. The intermediate representation may then be updated in act 714 from the updated model. In act 715, the symbolic equations may be updated from the updated intermediate representation. Processing may then return to state A where the updated model and updated symbolic equations may be displayed.

4. Creating the Intermediate Representation

Generation of an intermediate representation will now be explained in the context of an example model 800 shown in FIG. 8A. The model 800 has a single input terminal 801 labeled U, a gain element 802, an integrator element 803, and a single output terminal 804 labeled Y. The model 800 may represent a system having inputs, outputs, and state information from a "black box" point of view. In general, the variable u may be used to designate an input to an element or a system, the variable y to indicate the output of an element or a system, and the variable x to designate state information inside a system or an element.

At least some inputs and outputs of a model are considered root level variables. Root level inputs and outputs may refer to the inputs and outputs at the boundary of a hierarchical element of a model, such as a subsystem, a submodel (also referred to as a model reference block), and a top level hierarchical element of a model. For the model 800, the system input is a root level variable, and so is the system output. Other, block-level inputs and outputs may not necessarily be considered root level variables by default, although the user may designate them as such. State variables X may or may not be considered to be root level variables, depending on their context. In some embodiments, all state variables, e.g., X, may be treated as root level state variables, for example because they will appear in the final results. However, if a hierarchical element such as an atomic unit of a model, such as an atomic subsystem, includes states then a determination may be made whether the states within the hierarchical element such as the atomic unit will be made visible outside of the hierarchical element such as the atomic unit, e.g., to the parent element that includes the hierarchical element such as the atomic unit. The determination may be based on the value of one or more properties of the hierarchical element such as the atomic unit, which may be manually set or programmatically set. As described herein, this distinction between root level, non-root level, and state variables may be used to automatically generate the symbolic equations.

An example method that an automated system may use to generate symbolic equations for a model is as follows. The automated method may generate an intermediate representation from an element-by element analysis of the model. In this step (such as act 702 of FIG. 7), the element semantics 161 may look up each element in the executable model 800, and examine the runtime semantics of the element. These runtime semantics may be provided by the modeling system to define a corresponding part of the intermediate representation, such as to define a node in a directed graph.

In some implementations using the Simulink environment as the modeling system 110, runtime semantics for block elements may include an output method, an update method, a derivative method, an enable method, a disable method, an initialize method, and/or a zero crossing method. For example, model elements, such as blocks that are connected in a block diagram model, may represent dynamic systems. The functionality of a block may be provided based on the stages of execution of a block diagram model. The stages of execution may include computing output values, computing new state values, computing derivative values of state values, computing zero crossing indicators, computing initial values of outputs, computing initial values of states, computing reset values of outputs, computing reset values of states, etc.

In some embodiments, a block may comprise methods to evaluate its functionality for a stage of execution. For example, a mdlOutput method may compute the output values of a block, a mdlUpdate method may compute the new values for states of a block and/or may update the states with the new values, a mdlZeroCrossing method may compute the value of zero crossing indicators of a block, a mdlInitialize method may compute initial values of the states of a block and/or of the output of a block, a mdlEnable method may compute the reset values of the states of a block and/or the output of a block, and a mdlDisable method may compute the reset values of the states of a block and/or the output of a block.

To extract the symbolic equations of a set of connected blocks, the connectivity equations may be determined. Connectivity may be analyzed for block output that is connected to block input. For block output that is connected with block input the variables that are associated with the output and the input may be set to be equal.

The block functionality for an execution stage may be analyzed along with the connectivity equations and the block functionality for an execution stage of a connected block. Block functionality of different stages may be analyzed for different blocks. For example, the execution stage to compute derivative values of state values of one block may be analyzed in combination with the execution stage to compute output values of another block.

In some embodiments, graph traversal methods may be used to determine which blocks to analyze based on which execution stage. For example, a first block that is analyzed based on the stage to compute derivative values may have its input connected to the output of a second block. The second block may be analyzed based on the stage to compute output values. The second block may have its input connected to the output of a third block. The third block may also be analyzed based on the stage to compute output values.

To extract symbolic equations, the stages of execution may introduce further processing. For example, the execution stage where zero indicator values are computed may introduce additional functionality to conditionally consider equations (e.g., based on whether a value exceeds a threshold or not).

In some embodiments, symbolic equations may be grouped based on the stages of execution. For example, all equations that are related to computing the derivative values of a block with state may be grouped together, for example as a unit of evaluation (e.g.., a function, a module, a method, a procedure, etc.). In other embodiments, equations related to different stages of execution may be grouped together.

In some implementations, these "black box" semantics may provide the following variables for a model element:

Output method:

$$y = g(x_c, x_d^n, u)$$

Update method:

$$x_d^{n+1} = f_u(x_c, x_d^n, u)$$

Derivative method:

$$\dot{x}_c = f_d(x_c, x_d^n, u)$$

Zero-crossing method:

$$z = zc(x_c, x_d^n, u)$$

where y denotes an output of the element, u denotes an input of the element, $x_c$ indicates a continuous state variable for the element, $\dot{x}_c$ represents a time derivative of a state variable $x_c$, $x_d^n$ indicates a discrtete time state variable, and zc indicates a zerocrossing variable. The exact type of methods returned by the runtime semantics may depend on the corresponding block type. For example, a gain block may only have an output method, whereas an integrator block may have both an output method and a derivative method. The resulting set of variables, $V_m$, that represent a hierarchical model element, such as a subsystem or a submodel, may thus be identified from members of the set:

$$V_m = \{X_c, U_r, X_d^n, \dot{X}_c, X_d^{n+1}, Y_r, Z\}$$

where the upper case letters denote the set of all corresponding lower case variables. For example, $X_c$ denotes the set of all continuous state variables $x_c$ from the output method(s), update method(s), derivative method(s), and/or zero crossing method(s) that correspond to the element, the capital letter $X_d^n$ denotes the set of discrete time variables, $x_d^n$, and so forth. The subscript 'r' may stand for root.

Other semantics may also be used in generating the intermediate representation depending on the type of block, such as an initial value method, a mass matrix method, a forcing function method, a projection method, and/or a minor time method.

The variables obtained from the semantics for each element of the model 140 may be represented in the intermediate representation 160 as the vertices (or nodes) in a directed graph. Data dependencies among these vertices, such as connections between the blocks, may be represented as directed edges among the vertices. The edges may also represent run time methods that implement these dependencies.

Figure 8B:
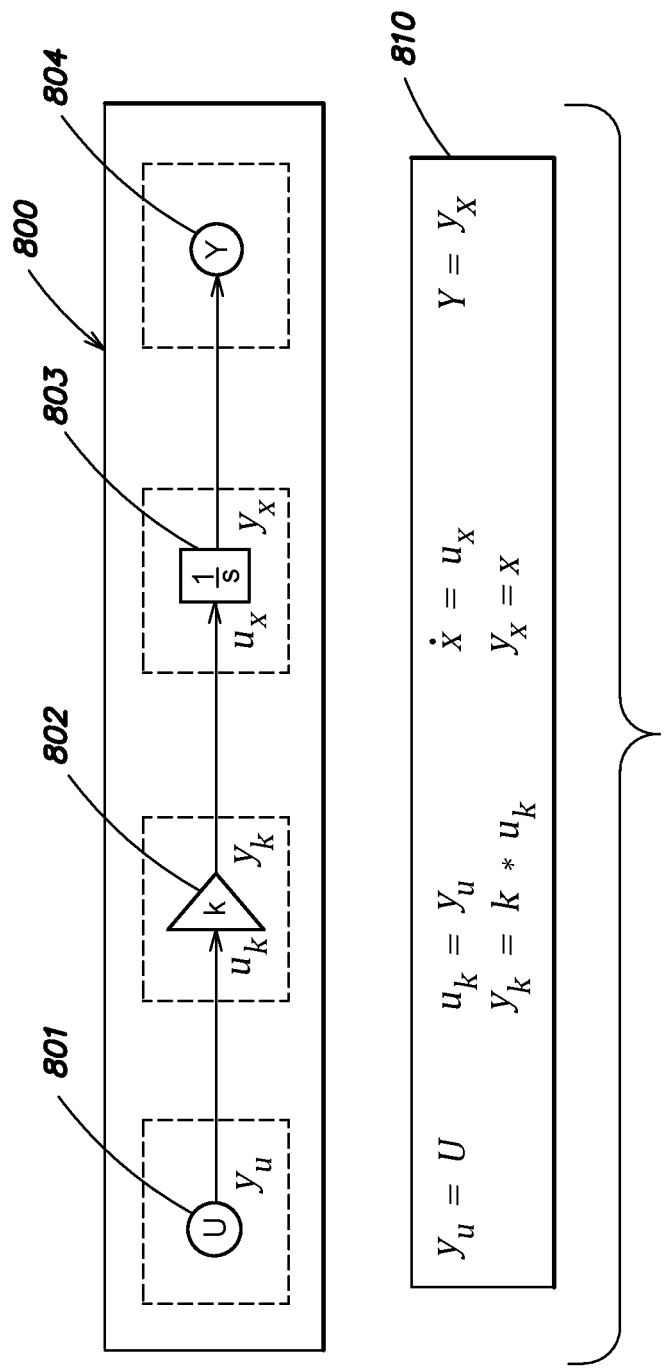
FIG. 8B is an example graphical model and element-by-element equations.

FIG. 8B shows the same model 800 shown in FIG. 8A with a block-by-block result for the corresponding symbolic equations. The element semantics 161 may first determine that the output method for the input terminal 801 may be represented by the equation $$y_u = u$$

Next, the element semantics 161 may obtain the specific runtime semantics for the gain element 802 from the corresponding element definition provided by the modeling system 110. In some implementations, for a time driven, dynamic modeling system such as the Simulink® environment, the element semantics may obtain the relations defined by a particular instantiation of the class definition for a particular gain element as included in the model 800. These relations may define how the gain element 802 generates its output, for example, the output method for the gain element 802 depends upon both a gain parameter, k, and upon the value of a signal presented at its input port from the terminal 801. Assigning a variable name, e.g., $u_k$ to the input of the gain element 802 and a different variable name, e.g., $y_k$ to the output, two equations may be generated by the element semantics 161 to represent the gain element 802 — a first equation based on its function as a gain block, and a second equation based on its connectivity:

$$y_k = k \cdot u_k$$

$$y_u = u_k$$

Similarly, the set of equations for the integrator element 803 may be determined from its derivative and/or output method(s) as:

$$\dot{x} = u_x$$

$$y_x = x$$

where x denotes the derivative of x. An input connection to the integrator element 803 from the output of the gain element 802 may be represented by a symbolic equation based on its connectivity:

$$y_k = u_x$$

Finally, the element semantics 161 may determine that the output terminal 804, based on its connectivity, may be represented by the symbolic equation $$y = y_x$$

Thus a full set of representative symbolic equations 810 may be generated for the model 800 using the element semantics 161 on an element-by-element analysis, such as to identify the output, update, and derivative methods for each element, and the connections between elements. The full set 810 may include seven equations.

In some embodiments, the corresponding symbolic equations may be limited to those block semantics that may be represented using four types of variables, including root level variables (e.g., ports (inputs and outputs)), such as U and Y, state variables, such as X, and zero crossing variables, e.g., Z.

The set of symbolic equations resulting from an element-by-element semantic analysis of the intermediate representation for the model 800 may not be particularly readable. For example, a human user may not find the resulting set of seven (7) equations 810 to be the preferred result. Thus, as was explained in connection with FIG. 7, the process for generating a simplified intermediate representation 160 may further proceed using the graph simplification 162, the graph tracing 163 and/or using the symbolic engine 164 to ultimately result in a reduced or minimal number of equations that may also use a reduced or minimal set of variables that are not root variables.

The simplified set of two equations that represent model 800 may be determined as:

$$Y = X$$

$$\dot{X} = kU$$

and as shown in FIG. 8A, these may then be the actual set of symbolic equations that are displayed simultaneously with the visual representation of the model 800.

It should also be understood that the user may wish to retain certain variables as being visible in the resulting symbolic equations even if they are not root variables. In that case, those variables may be elevated to the root level, as described in more detail herein.

Figure 9:
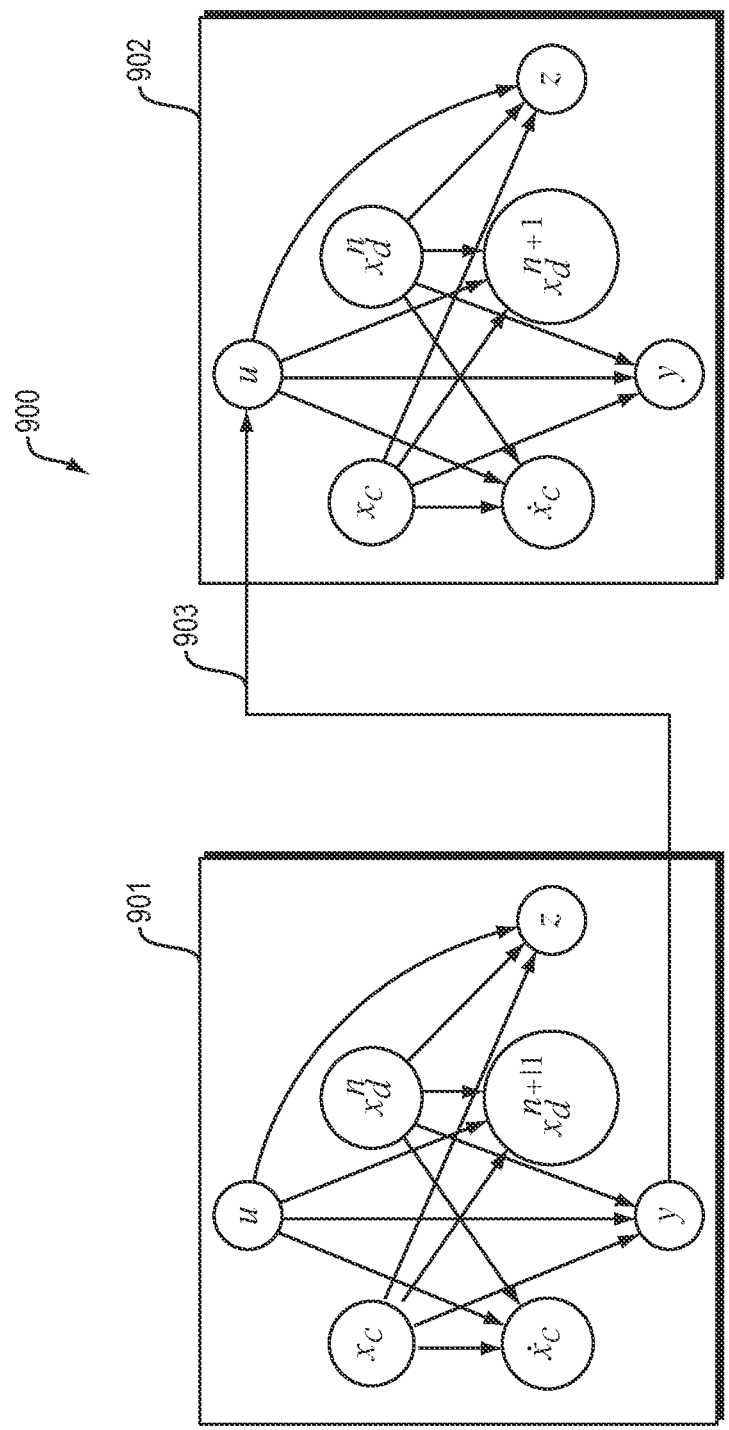
FIG. 9 is an example intermediate representation.

FIG. 9 shows an example case of an intermediate representation 900 derived from a model having two model elements. A first model element is represented by a first directed graph 901 that includes one or more nodes that correspond to the variables in the set $V_m$ that defines the behavior of the model element, and one or more edges between the nodes. A second model element is represented by a second directed graph 902 that also includes one or more nodes and one or more edges. Note that an output, y, of the first graph 901 is connected to an input, u, of the second graph 902, as indicated at 903. It is understood that FIG. 9 depicts an example case, and that the exact configuration of the graphs 901, 902 will depend on the type(s) of the corresponding element(s).

Figure 10C:
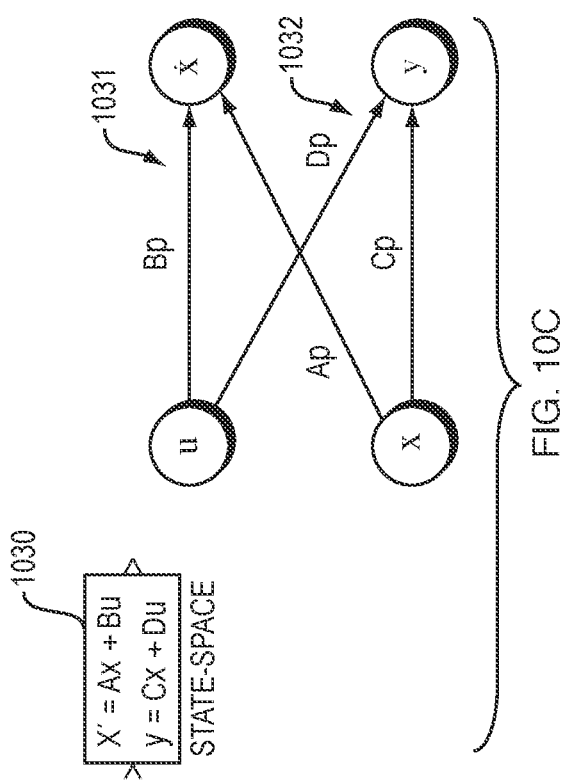
FIGS. 10A - 10D show example model elements and corresponding execution graphs.
Figure 10D:
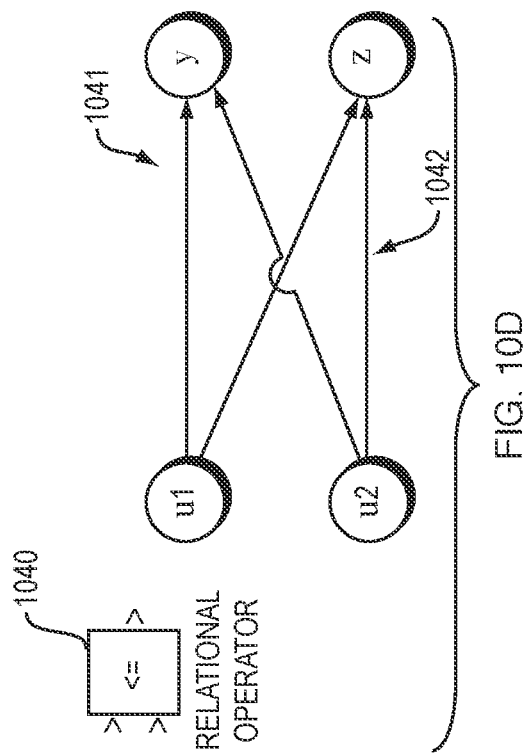
Figure 10A:
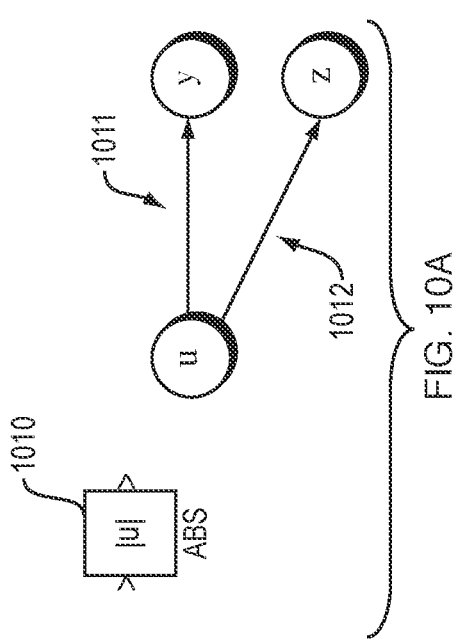

FIGS. 10A through 10D show some example elements and their corresponding execution semantics (e.g., Simulink "ExecBlock") in the form of directed graphs. FIG. 10A shows an absolute value (ABS) block 1010. The absolute value block 1010 includes an output method that generates a u to y branch 1011 (that is, the output branch of the directed graph). The absolute value also includes a zero crossing method that generates a u to z branch 1012 when the input changes from positive value to a negative value or vice versa.

Figure 10B:
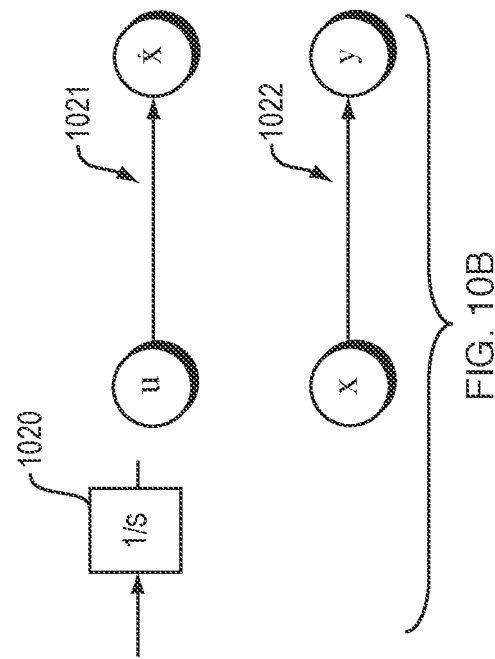

An integrator element (1/s) 1020 is shown in FIG. 10B, including a state variable element 1021 indicated by u propagating to the derivative of x, and an output element 1022 generating y equals x.

FIG. 10C shows an example state space element 1030 and its corresponding directed graph. This element 1030 generates a derivative method 1031 for x and an output method 1032 for y, given x and u as inputs.

FIG. 10D shows a less than or equal to relational operator element 1040 and its corresponding directed graph, generating an output method 1041 for y and zero crossing method 1042 for z.

In some embodiments, the directed graphs generated from the element semantics 161 may have one or more of the following attributes:

- vertices (nodes) in the graph represent variables;
- variable names beginning with u and y map to an input and output of an element, respectively;
- other nodes, such as x and $\dot{x}$ map to a buffer;
- edges (links) in the graph indicate data dependencies among variables (for example, an edge from u to y in the absolute value element of FIG. 10A is associated with an output method for that element);
- variables on the right-hand side of the corresponding symbolic equations are source nodes (representing element inputs); and/or
- variables on the left-hand side of the corresponding symbolic equations are sink nodes (representing element outputs).

It should be understood that symbolic equations corresponding to connection lines of a model may be equations that build the relations between one block's output y and the input variables u it is connected to and they are equal, thus a line's equation is y = u.

It should also be understood that other properties of the directed graph can be inherited from the model. For example, a vertex may have a specific label assigned to it (such as a Greek letter, a symbol, or a certain textual name), a data dimension (such as whether the variable is an array or a vector of a certain size); or a data type (such as integer, double, or floating point). Other properties may include sample time (the sample time being propagated from the corresponding element).

In some embodiments, the intermediate representation 160 may include annotations, and these annotations may be assigned as properties of the vertices in the directed graph. These annotations may dictate further properties to be used in generating the visual representation of the symbolic equations. The user may also annotate the directed graph directly, and these annotations may also include default annotations depending on the type of element.

Figure 11A:
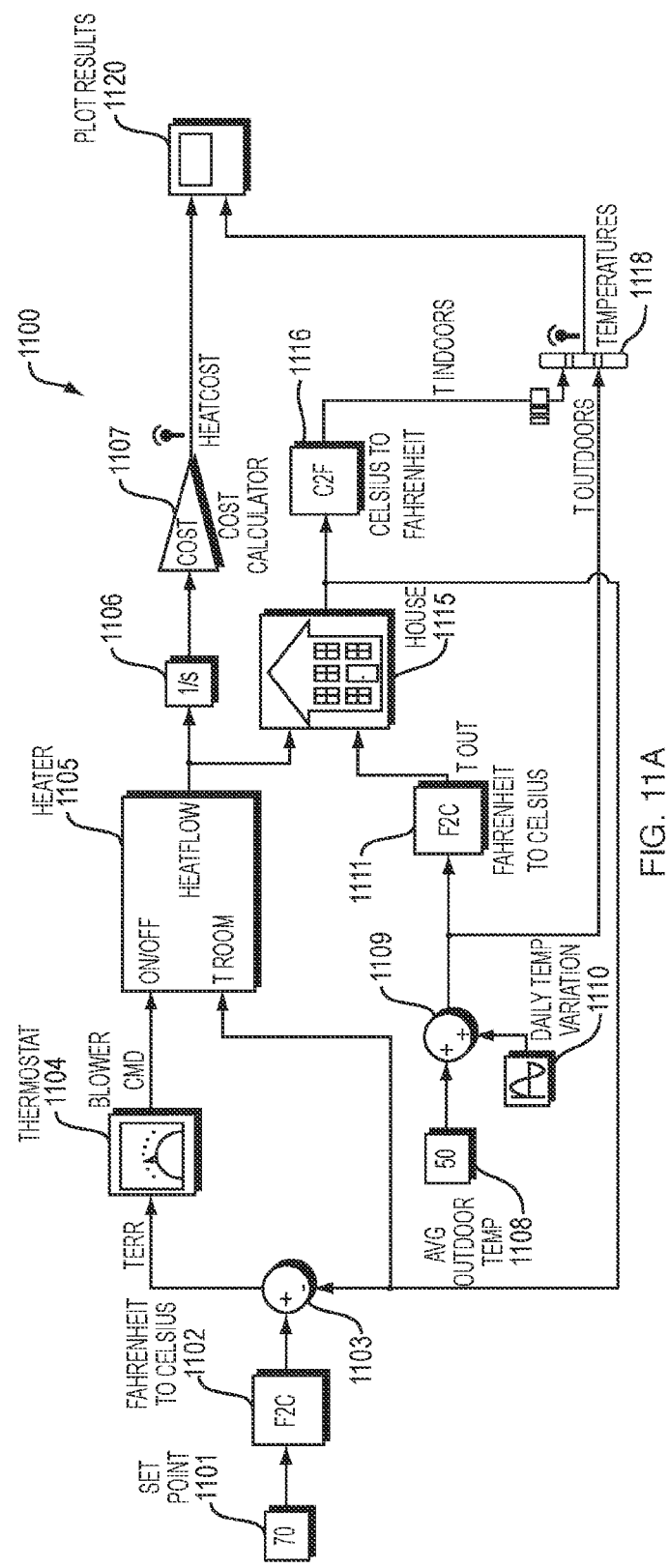
FIGS. 11A and 11B are partial views of an example graphical model.
Figure 11B:
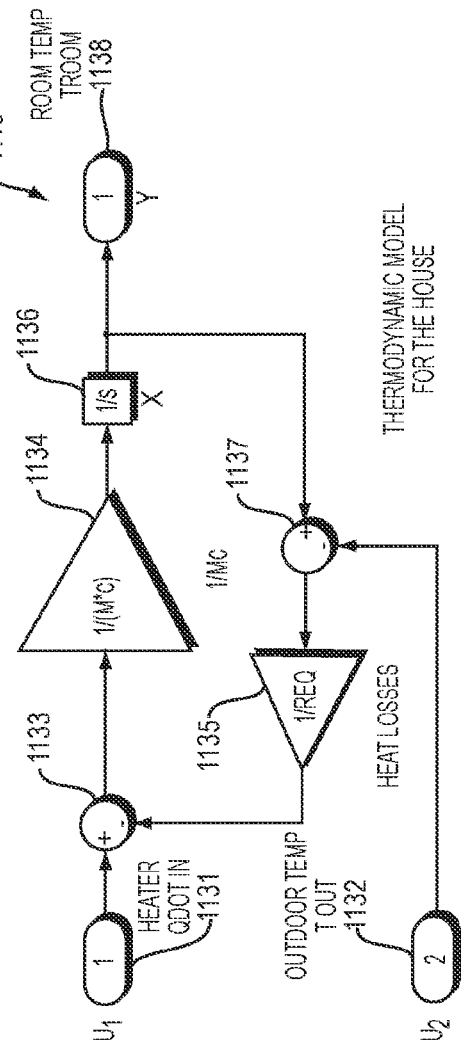

In addition to standardized elements for which the modeling system 110 may itself provide the semantics (for example, Simulink blocks that provide execution semantics as an ExecBlock), the intermediate representation 160 may also use a custom directed graph for a custom element. These custom directed graphs may be derived by the system from a model of the custom element, or may be provided by the user. FIG. 11A and FIG. 11B illustrate one example. Here, the modeling system 110 has been used to develop a model 1100 of heat flow through a house. The model 1100 includes an input including a temperature set point 1101, a Fahrenheit to Celsius converter 1102, a subtractor 1103, a thermostat 1104, a heater 1105, an integrator 1106, and a cost calculator 1107. An average outdoor temperature input 1108, a daily temperature variation input 1110, an adder 1109, a Fahrenheit to Celsius converter 1111, a subsystem component 1115 representing a thermal model of the house, a Celsius to Fahrenheit converter 1116 and a temperature indicator 1118 are also included in the model 1100. A scope output 1120 plots the results including the heat cost and temperature.

FIG. 11B is a more detailed view of the elements that comprise the subsystem component 1115, which may represent a thermal model of the house. The subsystem 1115 includes a subtractor 1133, a first gain 1134, an integrator 1136, a subtractor 1137, and a second gain 1135. Two inputs to the subsystem 1115 are provided: a derivative of heater input 1131 and an outdoor temperature output 1132. An output is provided as a room temperature 1138.

The user may wish to generate an intermediate representation for subsystem 1115 in a simpler form. This simpler representation may not include a directed graph representation of each element in the subsystem 1115, but may instead include fewer elements, or even be represented by an algorithm or computer code. More generally, the intermediate representation may be constructed hierarchically, with the user developing it from one or more subsystems in the model. The corresponding subgraphs for the one or more subsystems may then be individually connected together.

Figure 12:
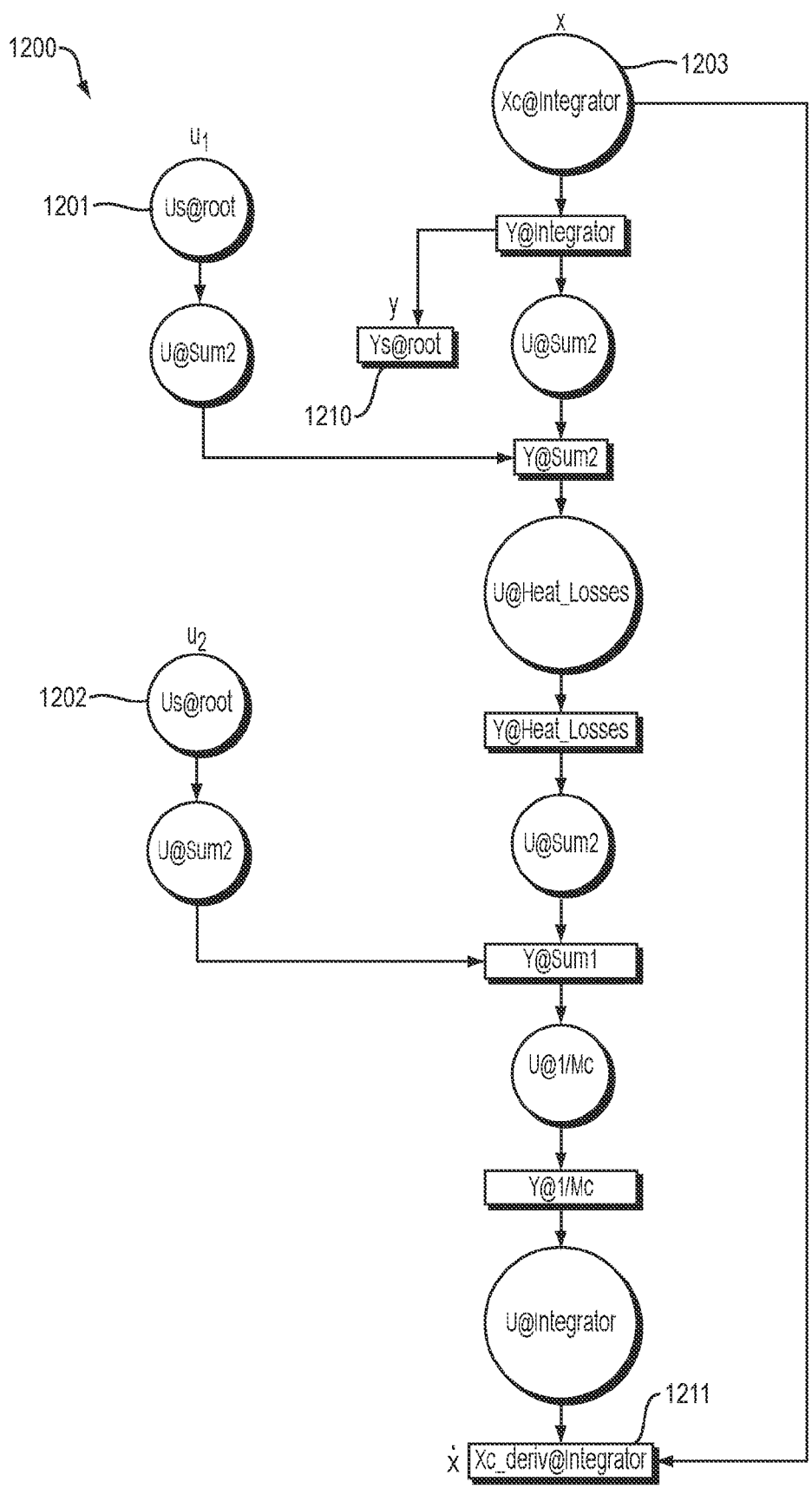
FIG. 12 is an example intermediate representation.

The user may use system-provided tools to develop a directed graph 1200 as shown in FIG. 12 to represent the thermal model subsystem 1115 of FIG. 11B. One can appreciate that the graph 1200 may not directly lead to symbolic equations having a reduced or minimum number of variables.

Figure 13:
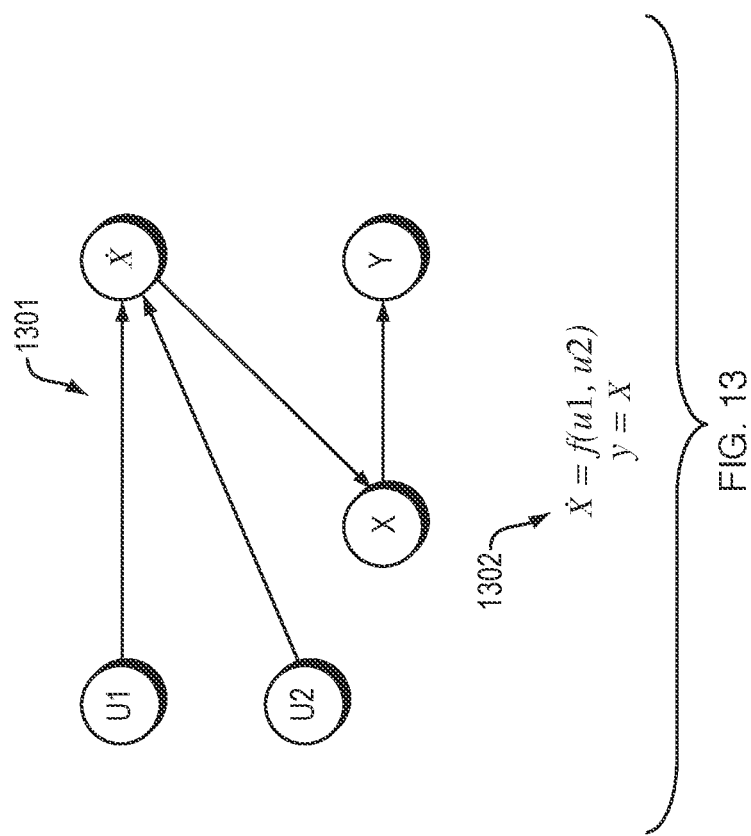
FIG. 13 is an example intermediate representation.

The user may wish to simplify the directed graph 1200 of FIG. 12. For example, root level variables may be identified. The root level variables may be those nodes that are source nodes and those nodes that are sink nodes. Source nodes (such as nodes 1201, 1202 and 1203) are those nodes that drive, e.g., provide output to, other nodes and that do not receive inputs from other nodes. Sink nodes (such as nodes 1210 and 1211) are those nodes that receive input from other nodes and that do not drive other nodes. A resulting simplified graph 1301 may include only the root level variables as shown in FIG. 13; and resulting symbolic equations 1302 may be simply:

$$\dot{x} = f(u1, u2)$$

$$y = x$$

Techniques for simplifying graphs are now discussed in more detail.

5. Constructing Symbolic Equations From the Intermediate Representation

As described herein in connection with FIG. 7, given an intermediate representation, an automated process may construct symbolic equations by tracing a directed graph of the intermediate representation. One example starting point for this process is shown in FIG. 14, which illustrates a directed graph intermediate representation 1400 generated from the element-by-element semantic analysis 161 of the model of FIG. 2.

Figure 14:
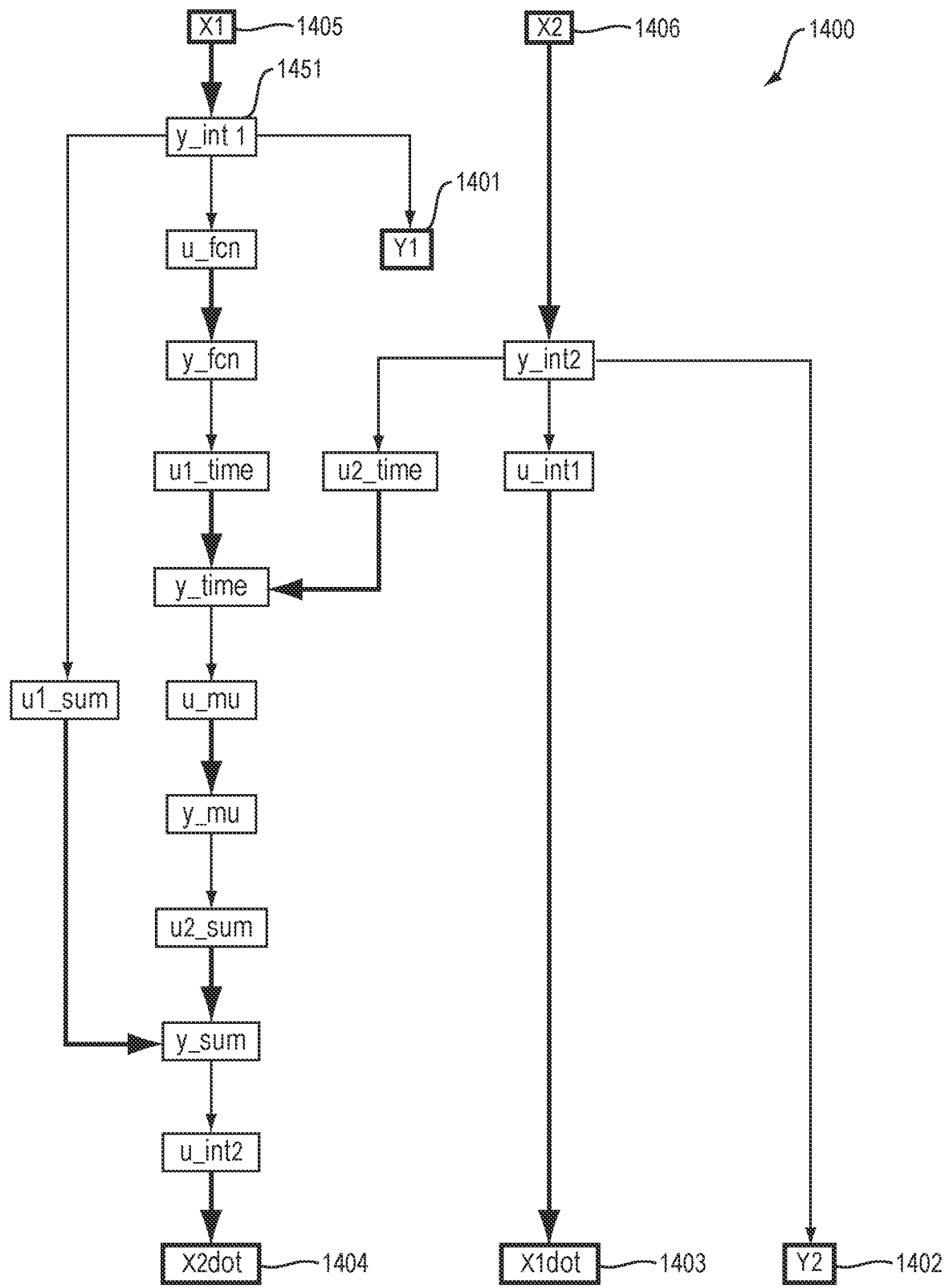
FIG. 14 is an example intermediate representation.

To generate symbolic equations from the directed graph 1400 of FIG. 14, the system may first reduce the directed graph 1400 so that the remaining variables include root variables (system inputs and outputs) and/or the state variables that are sink nodes or source nodes. In the example directed graph 1400, vertices that are sink nodes 1401 and 1402 represent the model outputs Y1 and Y2, vertices that are sink nodes 1403 and 1404 represent states $\dot{X}_1$ and $\dot{X}_2$, and vertices that are source nodes 1405 and 1406 correspond to variables $x_1$ and $x_2$. Generating the symbolic equations may then involve the graph tracing 163, for example, following the edges backwards from the sink nodes to the corresponding source node(s).

Creating the symbolic equations may identify the system or "root" level outputs represented by a sink node. These may then each become a variable on the left-hand side of a symbolic equation. In order to determine what is on the right-hand side of the corresponding symbolic equation, the process may trace back from the sink node towards the source node(s) that drive it, noting any intermediate nodes encountered along the way. So, for the example intermediate representation 1400 of FIG. 14, node $Y_1$ 1401 is seen to be driven by an output of y_int1 1451; and it is also seen that y_int1 1451 is driven by an output method of x1 1405. In other words, the element semantics 161 may determine the output method of x1 provides the right-hand side of the symbolic equation for $y_1$.

Figure 15:
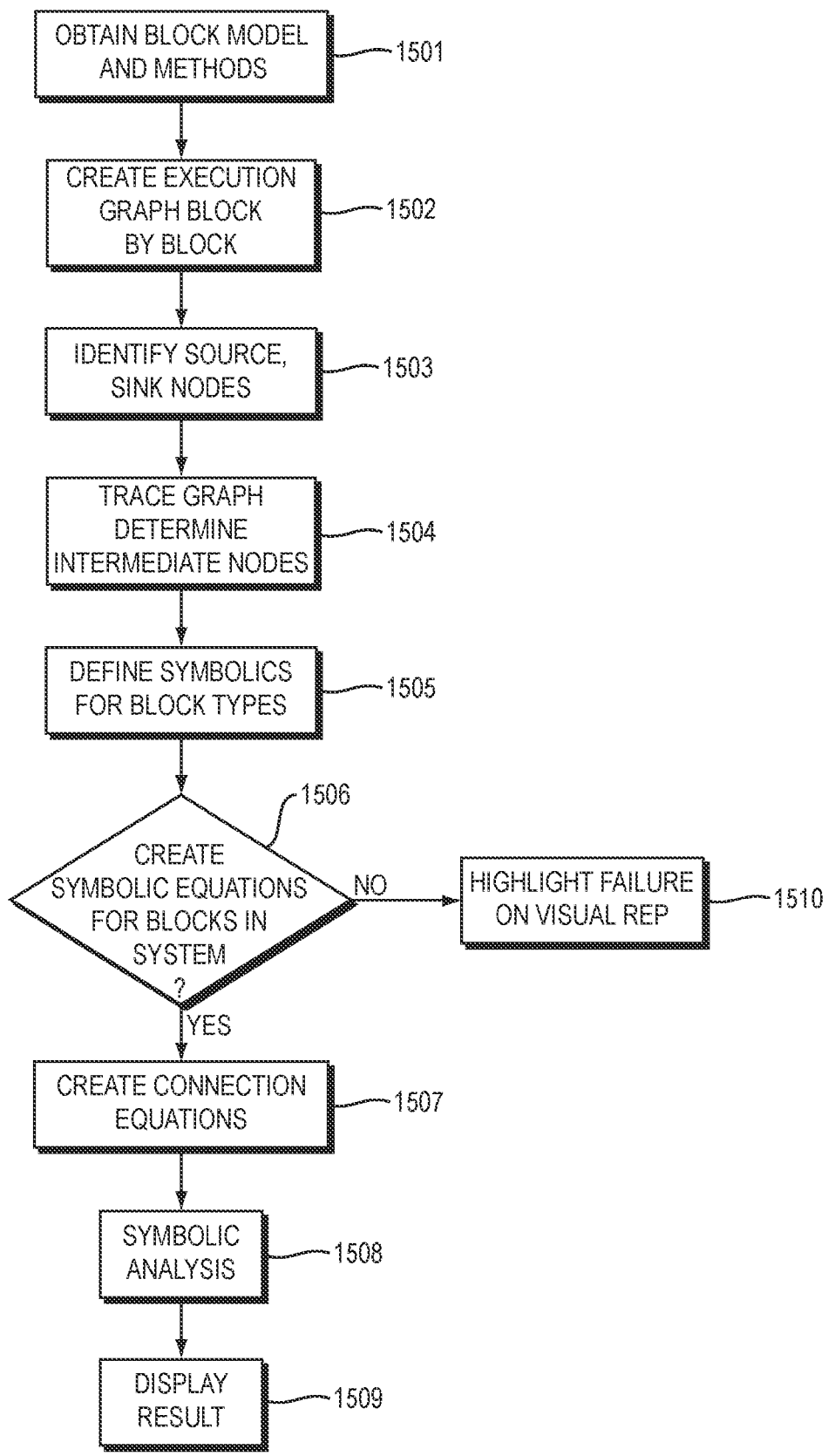
FIG. 15 is a flow diagram of an example method for constructing symbolic equations from a graphical model.

FIG. 15 is a more detailed flow diagram of the acts that may be performed to construct one or more symbolic equations from the intermediate representation 1400 of FIG. 14. Act 1501 obtains the methods (e.g., the output, update, derivative, enable, disable, initialize, and/or zero crossing methods) for each element included in the intermediate representation 1400. Act 1502 creates an initial directed graph from the element-by-element semantics, resulting in a graph such as that shown in FIG. 17.

In act 1503, model level inputs and model level outputs are identified as source nodes and sink nodes in the directed graph. In act 1504, the sink nodes are traced back towards the source nodes that drive them, to identify the intermediate nodes that generate the corresponding output. In act 1505, a symbolic equation is generated from the set of intermediate nodes so identified.

Act 1506 creates one or more symbolic equations that correspond to the elements in the model, and act 1507 adds connections between other elements, such as connections between block elements. In one example, if node A's output y_a is connected to node B's input, an equation corresponding to u_b = y_a is also created. In one optional implementation, if act 1506 cannot generate symbolic equations from the model, then the corresponding portion of the model may be highlighted on the visual representation of the model in act 1510.

In act 1508, after this initial set of symbolic equations is created, a further step of symbolic analysis may then be used to remove temporary variables from the symbolic equations.

Act 1509 may display the result.

Figure 17:
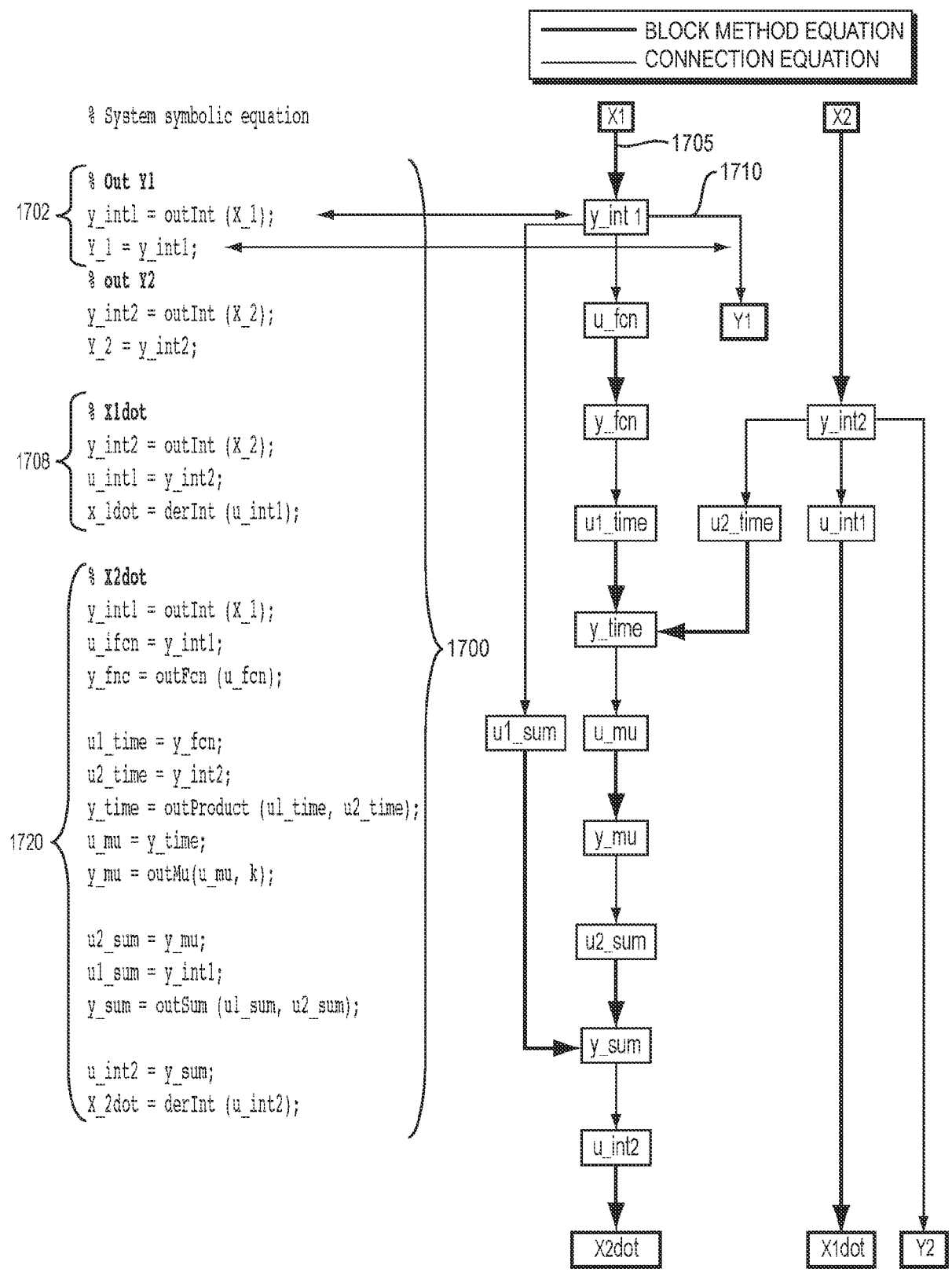
FIG. 17 is a continuation of the example code listing of FIG. 16.

The acts described in FIG. 15 may also be understood by turning to the example of FIGS. 16 and 17. FIGS. 16 and 17 are a more detailed view of a MATLAB code listing for an example intermediate representation that was shown in FIG. 14. Note the convention in the code listing of FIGS. 16 and 17 that the node X2dot in the graph is the variable X_2dot in the equations.

A first section 1602 of the code listing includes a list of the model level symbols used in the equations for each element type. A second section 1608 includes one or more class definitions for the different types of elements used in the graphical model, including equations for the class derived from their corresponding semantics. In this example, the model makes use of an integrator 1603, a sum 1604, a gain 1605, a product 1606 and a custom function 1607 (defined as y = 1-u²).

Class definitions may be obtained from the author of the block, who selected the equation(s) to implement the block's functionality. In some embodiments, class definitions and/or equations may be obtained by generating code for blocks where the code generation process is specially designed to extract equations. For purposes of symbolic equation extraction, the code does not have to include a high level of detail. For example, for a block that performs Fast Fourier Transform (FFT), the code may be y = fft(u), because FFT is a well understood symbolic function. For simple functions, such as sum, the code may be y = u1+u2, which may be preferred over other code that could be generated, such as y = sum(u1, u2).

The model or root level variables are indicated in a third section at 1610. These variables may be visible in the final set of readable symbolic equations. It is understood that there may be a default technique where only the inputs and outputs at the highest level of the model — such as only the system level source elements and sink elements —are included among those variables that will be visible in the readable equations. The root level variables in this example are represented at 1610:

syms  X_1  X_2  Y_1  Y_2  X_1dot  X_2dot

Other intermediate nodes in the graph have both inputs and outputs, and these may be treated as temporary variables. These temporary variables may also be included in a list 1611.

The set of symbolic equations for the model may be represented by further sections of code 1700 as shown in FIG. 17.

These code sections 1700 correspond to parts of the directed graph (which is reproduced in FIG. 17 for reference). The dark arrows in the directed graph (such as the arrow 1705 exiting element X1) represents a method for an element. The light arrows indicate connections between elements (such as the arrow 1710 between y_int1 and Y1).

In this example, sink node Y1 generated equations 1702, including a first equation $$y\_int1 = outInt(X\_1)$$

(obtained from the bold arrow 1705 in the graph) and a second equation:

$$Y\_1 = y\_int1$$

; (obtained from the light arrow 1710 connection).

Equations 1708 are created by tracing back from sink node xldot.

Tracing back from sink node x2dot also creates a number of equations 1720, with the equations being generated by the corresponding output, update, derivative, enable, disable, initialize, zero crossing methods or connections.

The result thus provides MATLAB code for a set of symbolic equations that represent the model, but before simplification.

As was explained in act 705 of FIG. 7, a code listing such as that of FIG. 17 may then be processed using the symbolic engine 164 such as the MATLAB Live Editor symbolic engine for MATLAB, or the Symbolic Math Toolbox. For example, given the list 1610 of model level I/O variables, the list 1611 of temporary variables, and the code listing 1700 in FIG. 17, the symbolic engine 164 may generate a simplified code listing that removes one or more temporary variable(s) from the code. In one example, the symbolic engine 164 may determine that an equation having temporary variables in it should be combined with one or more other equations. In another example, symbolic engine 164 may determine that an equation with only temporary variables in it may not be selected for output. The symbolic engine 164 may also use techniques such as transitive closure, Boolean linear fraction transformation, algebraic loop removal, or other techniques to simplify the code listing 1700.

Simplified code may be generated using the symbolic equation form outSum, outGain, outProduct, outFcn to further simply X_2dot to its final form. For example, given that outSum(u1, u2) equates to -x1+x2 in this model, and that (-1, 1) is the parameter of sum blocks, then the symbolic engine 164 may determine that:

$$x\_2dot = -x\_1 + outGain\big(\big(outProduct(x\_2, outFcn(x\_1))\big)\big),$$

$$x\_2dot = -x\_1 + K*\big(outProduct(x\_2, outFcn(x\_1))\big),$$

$$x\_2dot = -x\_1 + K*x\_2*(outFcn(x\_1)),$$

and therefore $$x\_2dot = -x\_1 + K*x\_2*(1 - x\_1*x1),$$

and thus the code in FIG. 17 for X_2dot which originally contained many temporary variables and many inputs has now been reduced.

6. Displaying the Symbolic Equations

Formatted, readable symbolic equations may then be generated from the simplified code. In one example, a LaTeX equation formatter may generate the result shown in FIG. 18B from the simplified code. The simplified code may be processed for use by other equation formatters, such as Microsoft Word, or a MathML application.

FIGS. 18A and 18B show a LaTeX example in more detail. The "strcat" function calls concatenate character arrays provided as arguments. Thus, the function call $$LaTeX(X\_1dot)$$

causes the LaTeX equation generator to evaluate the underlying symbolic equation for X_1dot and produce a visual representation of a symbolic equation 1810. Similarly, the call $$LaTex(X\_2dot)$$

expands the corresponding code to result in displaying the equation at 1850. LaTeX function calls, as implemented in the Symbolic Math Toolbox as part of the MATLAB Live Editor, may operate on the plaintext form of the code representing each symbolic expression.

In some embodiments, the symbolic equations may be created by first generating a graph that includes nodes representing one or more methods for each element of a model, and edges that represent connections between elements. The system may then trace from the resulting sink nodes back to the source nodes, following the relations, to create a detailed code representation of the model. The detailed code with temporary variables may then be submitted to symbolic analysis, for example to simplify the code and remove temporary variables. The simplified code that results may then be converted into a visual display of the symbolic equations, such as LaTeX or some other equation processor.

An additional step may also be implemented after simplification of the symbolic equations. For example, the equations generated after simplification may be considered to be longer than a desirable size, such as 25 characters long. Such a symbolic equation may be further broken up into two or more equations by re-inserting temporary variables (which may correspond to temporary variables that were initially removed, or not). Thus, in a further optional step, the symbolic equations may be further processed after they are simplified.

7. Example Technical Computing Environments

Figure 19:
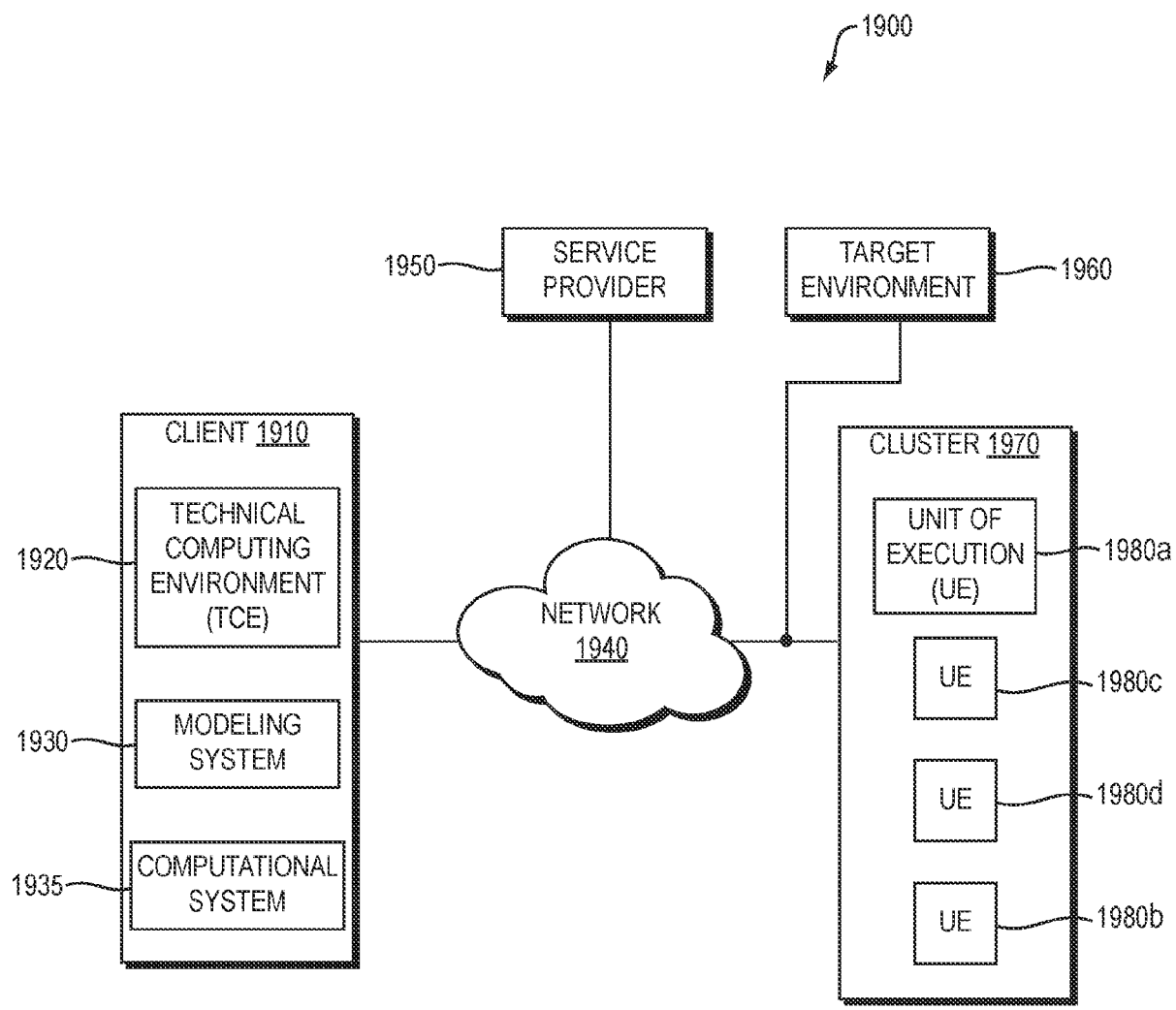
FIG. 19 is an example computing environment.

FIG. 19 illustrates a distributed environment 1900 that may be configured to practice an illustrative embodiment of the systems and methods described above. Environment 1900 may include a client 1910, network 1940, service provider 1950, target environment 1960 and cluster 1970. Note that the distributed environment illustrated in FIG. 19 is just one example of a distributed environment that may be used. Other distributed environments may include additional devices, fewer devices, or devices in arrangements that differ from the arrangement of environment 1900. For example, distributed environment 1900 may be implemented as a computing cloud.

Client 1910 may include a device capable of sending and/or receiving information (e.g., data) to and/or from another device, such as target environment 1960. Information may include any type of machine-readable information having substantially any format that may be adapted for use, e.g., in one or more networks and/or with one or more devices. The information may include digital information and/or analog information. The information may further be packetized and/or non-packetized. In an embodiment, client 1910 may download data and/or code via network 1940. For example, client 1910 can download code for interactive display of symbolic equations from graphical models.

Client 1910 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities and/or generate one or more results.

In an example embodiment, client 1910 may include a technical computing environment (TCE) 1920, modeling software 1930 and computational programming software 1935. TCE 1920 may include a graphical block diagram modeling environment that may be used to design models, execute models, and manipulate the models in accordance with techniques described herein. TCE 1920 may be graphical-based TCE 100. In other illustrative embodiments, client 1910 may include other components, applications, etc. Illustrative embodiments of TCE 1920 may contain computer-executable instructions (e.g., code) and data that are configured to implement the TCE. The instructions may include instructions configured to implement modeling software 1920 and/or graphical analysis software 1935. An example embodiment of graphical-based TCE 100 may be implemented in a TCE 1920.

Modeling software 1930 and computational software 1935 may be graphical, textual, or a combination that includes both textual and graphical capabilities/features. Modeling software 1930 may include computer-executable instructions that allow, e.g., a user to build and/or execute a model. For example, modeling software 1930 may allow a user to build and execute a time-based model, a state-based model, an event-based model, a dataflow-based model, etc. Modeling software 1930 may include code generation logic which may include hardware and/or software for converting a model into a program or code in a computer programming language (e.g., C, C++, SystemC, etc.). In one example, a code generator may accept a model that is created in the core simulation logic and may generate a hardware description language (HDL). The generated code may be editable using an editor. An execution engine may be configured to compile and link the generated code to produce an "in-memory executable" version of model. The in-memory executable version of the model may be used, for example, to simulate, verify, trim, or linearize the model. An example embodiment may be implemented as part of modeling software 1930.

Computational system 1935 may include computer-executable instructions that allows users to perform tasks related to disciplines, such as, but not limited to, mathematics, science, engineering, medicine, business, etc. The computational system 1935 permits a user to perform tasks more efficiently than if the tasks were performed in another type of computing environment, such as an environment that requires the user to develop code in a conventional programming language, such as C++, C, Fortran, Java, etc.

In some implementations, the computational system 1935 may include a dynamically typed language that can be used to express problems and/or solutions in mathematical notation. For example, the computational system 1935 may use an array as a basic element, where the array may not require dimensioning. In addition, the computational system 1935 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

Network 1940 may include any network capable of exchanging information between entities associated with the network, including, for example, client 1910, service provider 1950, target environment 1960 and cluster 1970. Exchanged information may include, for example, packet data and/or non-packet data. Implementations of network 1940 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1940 may include various network devices, such as, for example, routers, switches, firewalls, servers, etc. Portions of network 1940 may be wired (e.g., using wired conductors, optical fibers, etc.) and/or wireless (e.g., free-space optical (FSO), radio frequency (RF), acoustic transmission paths, etc.). Portions of network 1940 may include a substantially open public network, such as the Internet. Portions of network 1940 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Target environment 1960 may include a device that receives information from client 1910, service provider 1950, or cluster 1970. For example, target environment 1960 may receive executable code from client 1910, where the executable code allows target environment to perform an operation when the code is executed. Client 1910 may have generated the executable code using TCE 1920, modeling software 1930, and/or a code generator (not shown in FIG. 19).

Cluster 1970 may include a number of processing resources that perform processing on behalf of another device, such as client 1910, service provider 1950 and/or target environment 1960. Cluster 1970 may include logic that manages and/or coordinates the operation of multiple processing resources. For example, cluster 1970 may send data to and/or receive results from these processing resources. In an illustrative embodiment, cluster 1970 may include units of execution (UEs) 1980*a*, 1980*b*, 1980*c*, and 1980*d* (collectively UEs 1980) that may perform processing on behalf of client 1910 and/or another device, such as service provider 1950. An example embodiment of the invention may be implemented on one or more UEs 1980.

UEs 1980 may include hardware, software, or hybrid logic that performs processing operations on behalf of TCE 1920. For example, in an illustrative embodiment UEs 1980 may parallel process portions of a graphical model created by user of client 1910. This parallel processing may include performing analysis on the model, parsing the model into portions, and/or aggregating results from respective UEs 1980 into a single result for display to a user at client 1910. UEs 1980 may reside on a single device or chip or on multiple devices or chips. For example, UEs 1980 may be implemented in a single application specific integrated circuit (ASIC) or in multiple ASICs. Likewise, UEs 1980 can be implemented in a single computer system using virtualization techniques. Other examples of UEs 1980 may include field programmable gate arrays (FPGAs), complex programmable logic devices (CPLDs), application specific instruction-set processors (ASIPs), microprocessors, etc.

A TCE 1920 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

8. Illustrative Computing Architecture Example System

Figure 20:
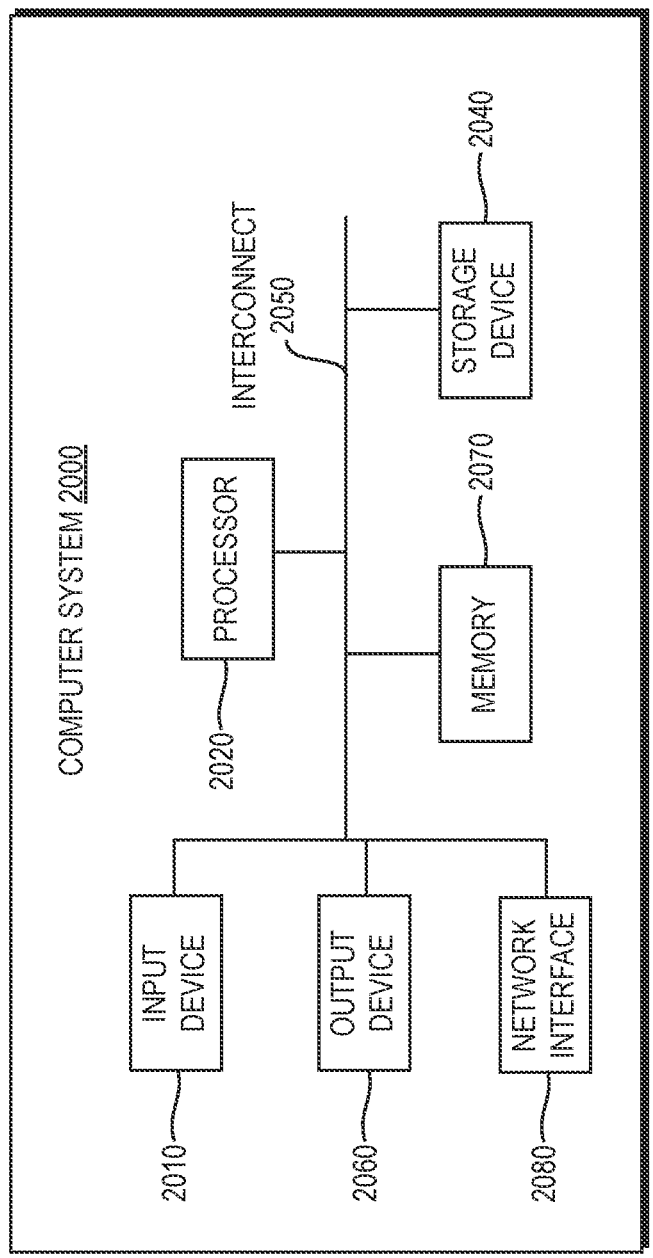
FIG. 20 is an example computer system.

FIG. 20 illustrates an example of a computer system 2000 that may be configured to practice an embodiment. For example, computer system 2000 may be used to implement client 1910, service provider 1950, target environment 1960, modeling system 1930, computational system 1935, etc. Computer system 2000 may include processor 2020, memory 2070, storage device 2040, input device 2010, output device 2060, interconnect 2050 and network interface 2080. Processor 2020 may include logic configured to execute computer-executable instructions that implement illustrative embodiments of the invention. An example of a processor that may be used with the invention includes the Pentium processor available from Intel Corporation, Santa, Clara, Calif. The instructions may reside in memory 2070 and may include instructions associated with TCE 1920.

Memory 2070 may be a computer-readable medium that may be configured to store instructions configured to implement illustrative embodiments of the invention. Memory 2070 may be a primary storage accessible to processor 2020 and can include a random-access memory (RAM) that may include RAM devices, such as, for example, Dynamic RAM (DRAM) devices, flash memory devices, Static RAM (SRAM) devices, etc. Storage device 2040 may include a magnetic disk and/or optical disk and its corresponding drive for storing information and/or instructions. Memory 2070 and/or storage device 2040 may permit modeling system 1930 and computational system 1935 to exchange data, such as the model 140, intermediate representation 160, models 140, and/or symbolic equation 150 data structures described in connection with FIG. 1 and elsewhere herein.

Interconnect 2050 may include logic that operatively couples components of computer system 2000 together. For example, interconnect 2050 may allow components to communicate with each other, may provide power to components of computer system 2000, etc. In an illustrative embodiment of computer system 2000, interconnect 2050 may be implemented as a bus.

Input device 2010 may include logic configured to receive information for computer system 2000 from, e.g., a user. Illustrative embodiments of input device 2010 may include keyboards, cameras, touch sensitive areas (e.g., displays), multi-point input devices, biometric sensing devices, computer mice, trackpads, trackballs, pen-based point devices, etc. Output device 2060 may include logic configured to output information from computer system 2000. Illustrative embodiments of output device 2060 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Interaction for the visualization may be based on receiving input from a user via input device 2010 and providing output to a user via output device 2060.

Network interface 2080 may include logic configured to interface computer system 2000 with a network, e.g., network 1940, and may enable computer system 2000 to exchange information with other entities connected to the network, such as, for example, service provider 1950, target environment 1960 and cluster 1970. Network interface 2080 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 2000 to any type of network.

It should be noted that illustrative embodiments may be implemented using some combination of hardware and/or software. It should be further noted that a computer-readable medium that includes computer-executable instructions for execution in a processor may be configured to store illustrative embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an illustrative embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors 2020. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB software], a worker, a lab, etc.) that performs and/or participates in parallel programming activities. For example, a software unit of execution may perform and/or participate in parallel programming activities in response to receipt of a program and/or one or more portions of the program. In an illustrative embodiment, a software unit of execution may perform and/or participate in substantially any type of parallel programming using one or more hardware units of execution. Illustrative embodiments of a software unit of execution may support one or more threads and/or processes when performing processing operations.

9. Alternative Illustrative Embodiments

An alternative illustrative embodiment may implement a TCE 1920 using one or more text-based products. For example, a text-based TCE 1920, may be implemented using products such as, but not limited to, MATLAB® programming language by The MathWorks, Inc.; Octave; Python; Comsol Script; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dassault Systems.

Other illustrative embodiments may implement a TCE 1920 and/or a modeling system 1930 in a graphically-based TCE 1920 using products such as, but not limited to, Simulink®, Stateflow®, SimEvents®, etc., by The MathWorks, Inc.; VisSim by Visual Solutions; MATRIXx or LabView® by National Instruments; Dymola by Dassault Systems; WiT by DALSA Coreco; Keysight VEE by Keysight Technologies; Vision Program Manager from PPT Vision; Khoros from Khoral Research; Gedae by Gedae, Inc.; Scicos from (INRIA); Virtuoso from Cadence; Rational Rose from IBM; Rhopsody or Tau from IBM; Ptolemy from the University of California at Berkeley; or aspects of a Unified Modeling Language (UML) or SysML environment.

Another alternative illustrative embodiment may be implemented in a combined TCE 1920 that combines features of a text-based and graphically-based TCE 1920. In one implementation, one TCE 1920 may operate on top of the other TCE 1920. For example, a text-based TCE 1920 (e.g., MATLAB®) may operate as a foundation and a graphically-based TCE 1920 (e.g., Simulink®) may operate on top of MATLAB® and may take advantage of text-based features (e.g., commands) to provide a user with a graphical user interface and graphical outputs (e.g., graphical displays for data, dashboards, etc.).

Modeling system 1930 may include a development tool (e.g., a software application) that enables creation, modification, design, and/or simulation of graphical models representing systems, such as dynamic systems. Furthermore, modeling system 1930 may enable the generation of executable code based on a graphical model.

The computational system 1935 may provide symbolic equation editing tools, and/or tools for plotting equations, data, surface images, and/or volumetric representations. Computational system 1935 may also include toolboxes for signal processing, image processing, parallel processing and similar features.

Modeling system 1930 and computational system 1935 may share data stored on or accessible in some other way by client 1910.

Modeling system 1930 may include a development tool that enables existing software components to be used in the creation of a model that may enable generation of executable code based on the model. For example, the modeling system 1930 may provide a user interface for modeling and executing a modeled system (e.g., based on differential equations, difference equations, algebraic equations, discrete events, discrete states, stochastic relations, etc.).

The modeled system may be a dynamic system (either natural or man-made) whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), biochemical systems (gene expression, protein pathways), weather, and climate pattern systems, and/or any other natural dynamic system. Man-made or engineered dynamic systems may include, for example, a bouncing ball, a spring with a mass tied on an end, automobiles, airplanes, control systems in major appliances, communication networks, audio signal processing systems, and a financial or stock market, and/or any other man-made or engineered dynamic system.

The model represented in modeling system 1930 may have various execution semantics that may be represented in the model as a collection of modeling entities, often referred to as "elements". An element may generally refer to a functionality that may be used in the model. An element may be represented graphically, textually, and/or stored in some form of internal representation. Also, a particular visual depiction used to represent the element, for example in a graphical block diagram, may be a design choice. These elements of the executable model may be stored in a logical workspace and/or presented for display via a user interface that is associated with the logical workspace.

An element may be hierarchical in that the element itself may comprise one or more elements that make up the element. An element comprising one or more elements (sub-elements) may be referred to as a subsystem. A subsystem may be configured to represent a subsystem of the overall system represented by the model. A subsystem may be a masked subsystem that is configured to use a logical workspace that contains only variables that are readable and writeable by elements included in the masked subsystem. This hierarchy may be taken into account such as by generating equations only for a selected subsystem of interest.

A model (e.g., a functional model) in a modeling system may include entities with relationships between the entities, and the relationships and/or the entities may have attributes associated with them. The entities may include model elements such as elements and/or ports. The relationships may include model elements such as lines (e.g., connector lines) and references. The attributes may include model elements such as value information and meta information for the model element associated with the attributes. A model may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information e.g., whether model elements should share memory during execution), model processing information (e.g., whether common functionality should be shared in code that is generated for a model), etc.

Algebraic Loops

In some modeling environments, a model may be created that includes an algebraic loop. An algebraic loop occurs when a signal loop exists in the model with only direct feedthrough model elements within the loop. A direct feedthrough model element refers to a model element whose output is a function of the current value of an input to the model element. For example, the value of the input to the model element directly controls the value of its output. A model element whose output is not a function of the current value of the model element's input is a non-direct feedthrough model element. For example, a model element that maintains a state variable and whose output depends on the state variable only is a non-direct feedthrough model element. In the Simulink® model-based design environment, Gain, Product, and Sum blocks are examples of direct feedthrough model elements, and Unit Delay and Integrator blocks are examples of non-direct feedthrough model elements.

Figure 21:
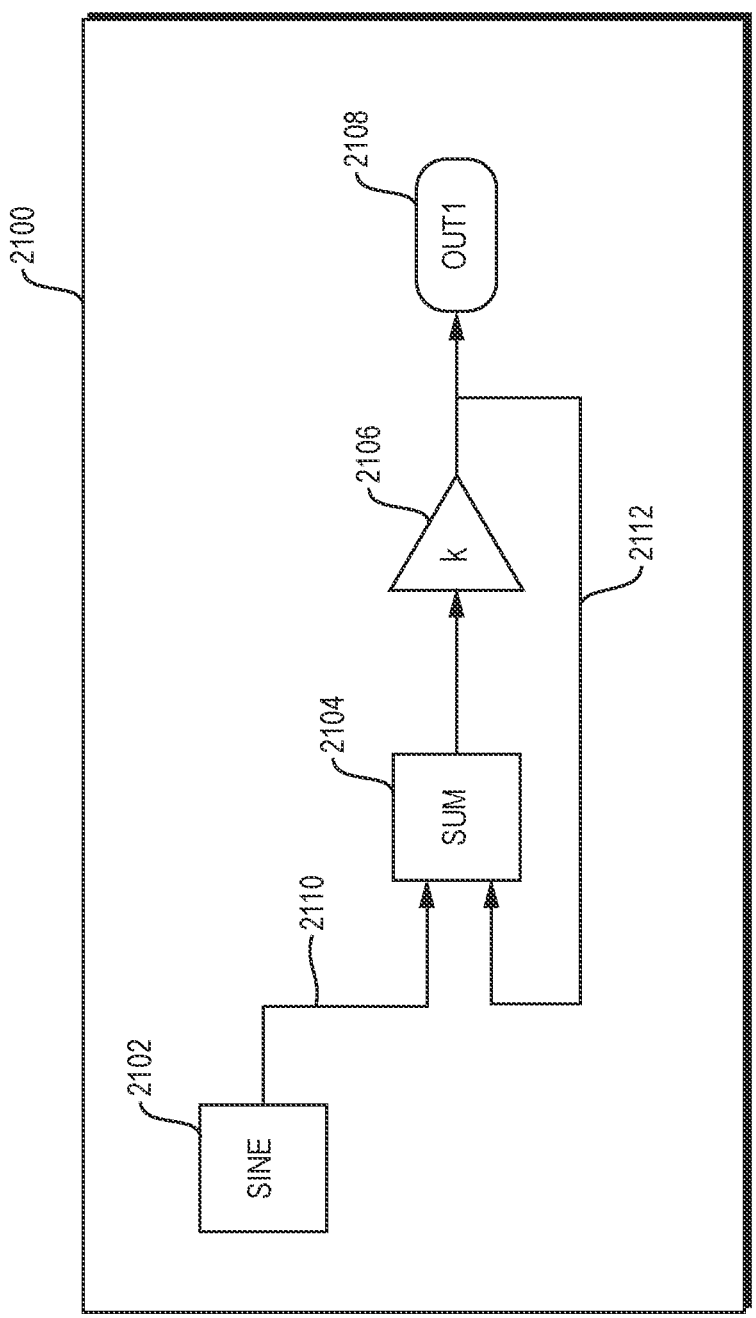
FIG. 21 is an illustration of an example graphical model.

FIG. 21 is an illustration of an executable graphical model 2100 that includes an algebraic loop. The model 2100 includes a Sine block 2102, a Sum block 2104, a Gain block 2106 with a gain parameter of 'k', and an Outport block 2108. The output of the Sine block 2102 is a first input to the Sum block 2104 as indicated by arrow 2110. The output of the Gain block 2106 feeds the Outport block 2108, and also provides the second input to the Sum block 2104, as indicated by arrow 2112. Because Gain blocks are direct feedthrough blocks, the arrow 2112 establishes an algebraic loop within the model 2100.

Figure 22:
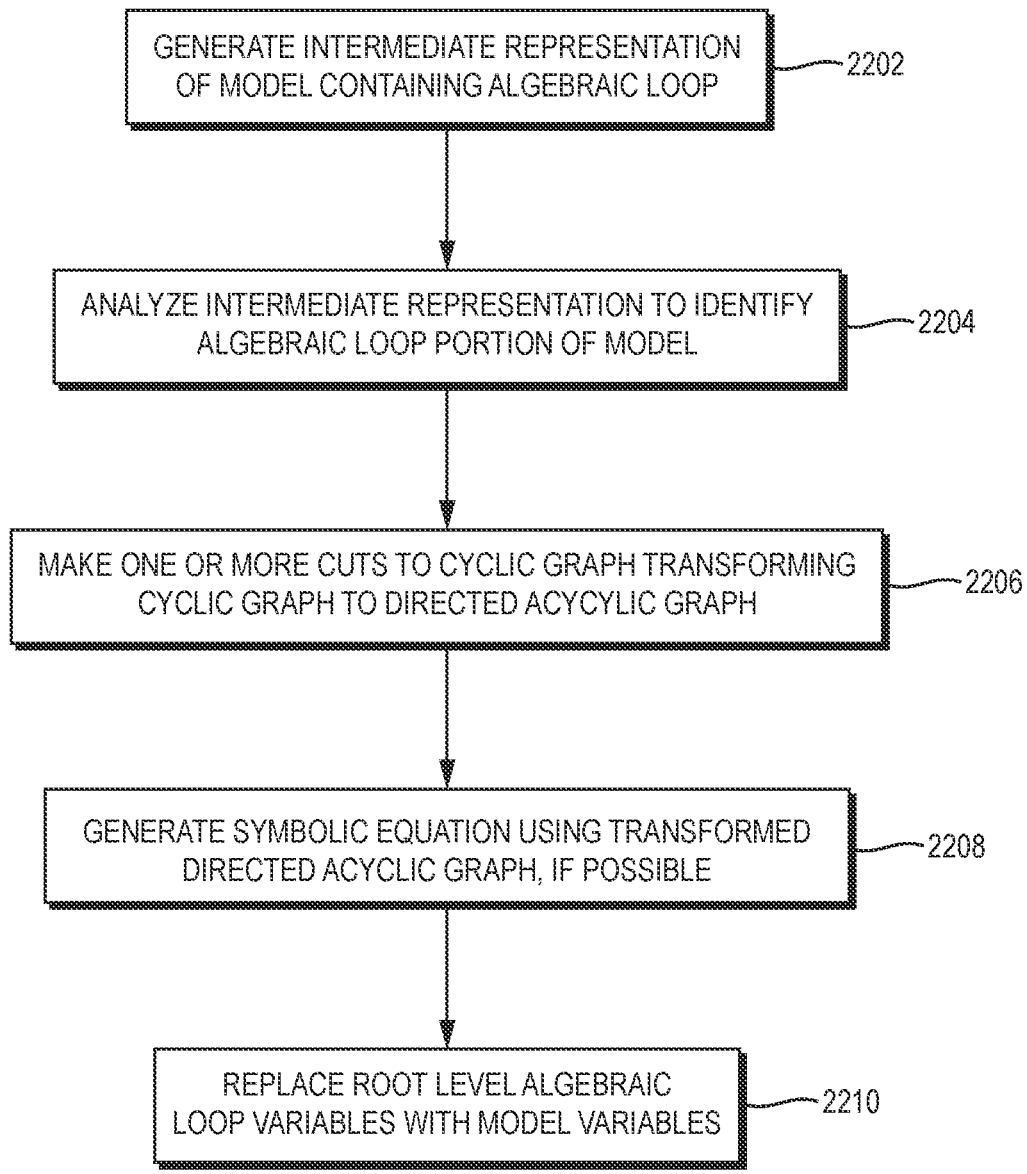
FIG. 22 is a flow diagram of an example method.

The symbolic engine 164 may be configured to generate symbolic equations from models that include algebraic loops. For example, the symbolic engine 164 may make one or more cuts to the algebraic loop portion of a model to thereby eliminate the algebraic loop. FIG. 22 is a flow diagram of an example method in accordance with an embodiment of the disclosure. The computational system 120 may generate an intermediate representation of a model that includes an algebraic loop, as indicated at step 2202. The intermediate representation may be in the form of an execution graph of the model.

Figure 23:
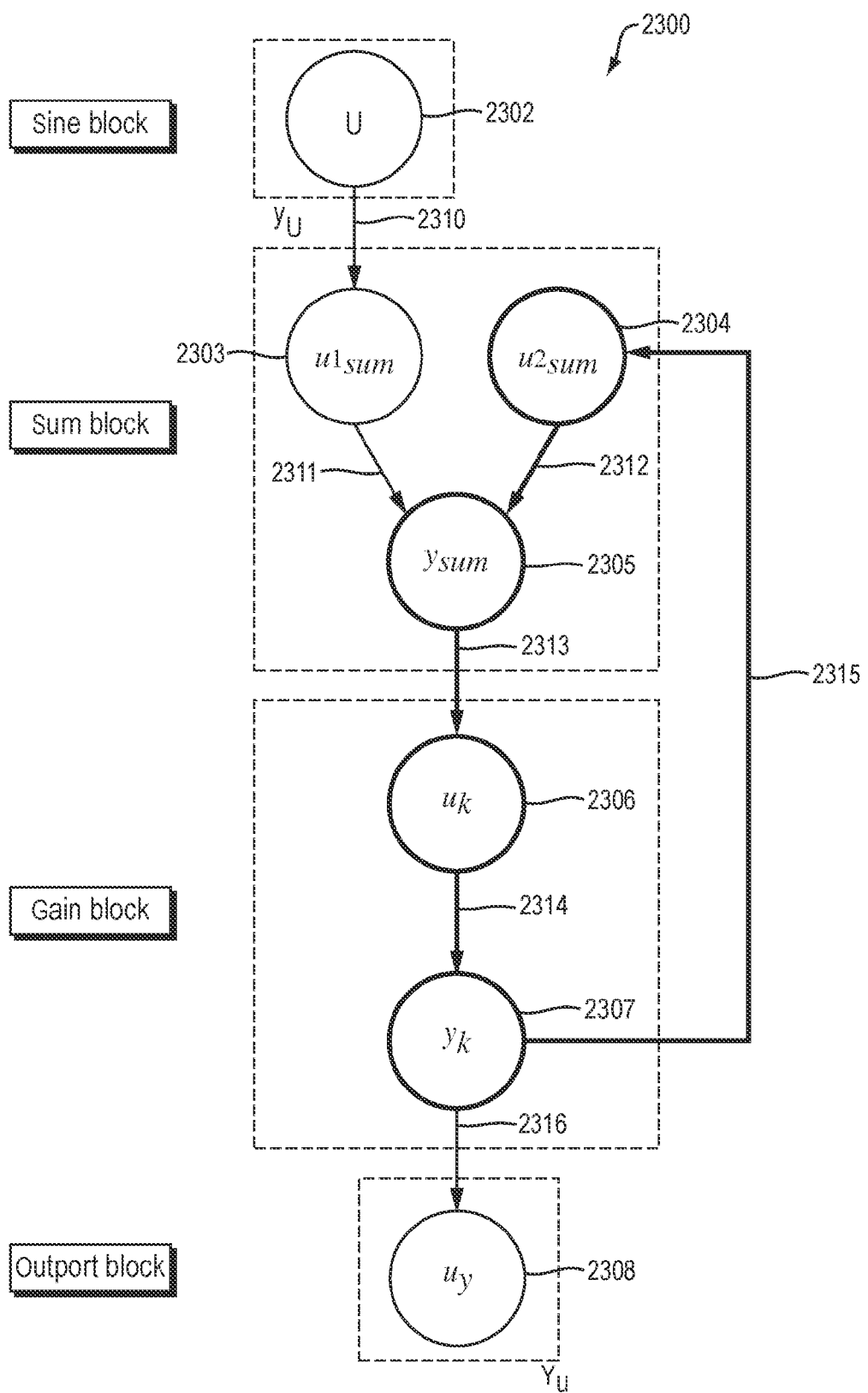
FIG. 23 is an example of an execution graph.

FIG. 23 is an example directed execution graph 2300 of the model 2100. The graph 2300 includes nodes 2302-2308, corresponding to the blocks of the model 2100, and edges 2310-2316. The strongly connected part of the graph 2300, which corresponds to the algebraic loop, includes nodes 2304-2307 and edges 2312-2315, as illustrated in FIG. 23 in bold. Because the model 2100 includes an algebraic loop, the graph 2300 is not a Directed Acyclic Graph (DAG). Instead, the graph 2300 is a Cyclic Graph.

Returning to FIG. 22, the computation system 120 may analyze the graph 2300 and identify the algebraic loop, as indicated at step 2204. For example, the computation system 120 may apply one or more graph algorithms to identify the portion of the graph that is strongly connected. This portion corresponds to the algebraic loop. Exemplary graph algorithms include Kosaraju's algorithm, Tarjan's strongly connected components algorithm, and the path-based strong component algorithm.

The computation system 120 may make one or more cuts to the cyclic graph thus converting the cyclic graph to a DAG, as indicated at step 2206. For example, the system may assign algebraic loop variables, which may be considered root level variables of the model, to one or more variables included in the algebraic loop. In some embodiments, the computation system 120 may use heuristics to identify the one or more variables to which algebraic loop variables are assigned. For example, the computation system 120 may select the variable associated with the output of a particular block of the algebraic loop, such as the output variable $y_{sum}$ of the Sum block 2104 of the model 2100. The system may thus assign the root level algebraic loop variable $Y_{alg}$ to the $y_{sum}$ variable. In addition, the computation system 120 may introduce one or more constraints for the algebraic loop variable, as determined by the algorithm implemented by the model. For example, with reference to the model 2100, the system may specify that the output of the Sum block 2104 equals the input of the Gain block 2106 as the constraint. Accordingly, the root level algebraic loop variable, $Y_{alg}$, may replace $y_{sum}$ and $u_k$ associated with nodes 2305 and 2306 in the graph 2300. By assigning root level algebraic loop variables to one or more variables of the algebraic loop, the system converts one or more blocks of the algebraic loop into sink blocks and one or more other blocks of the algebraic loop into source blocks. As a result, the original cyclic graph is transformed into a DAG that includes the algebraic loop variable, $Y_{alg}$.

Figure 24:
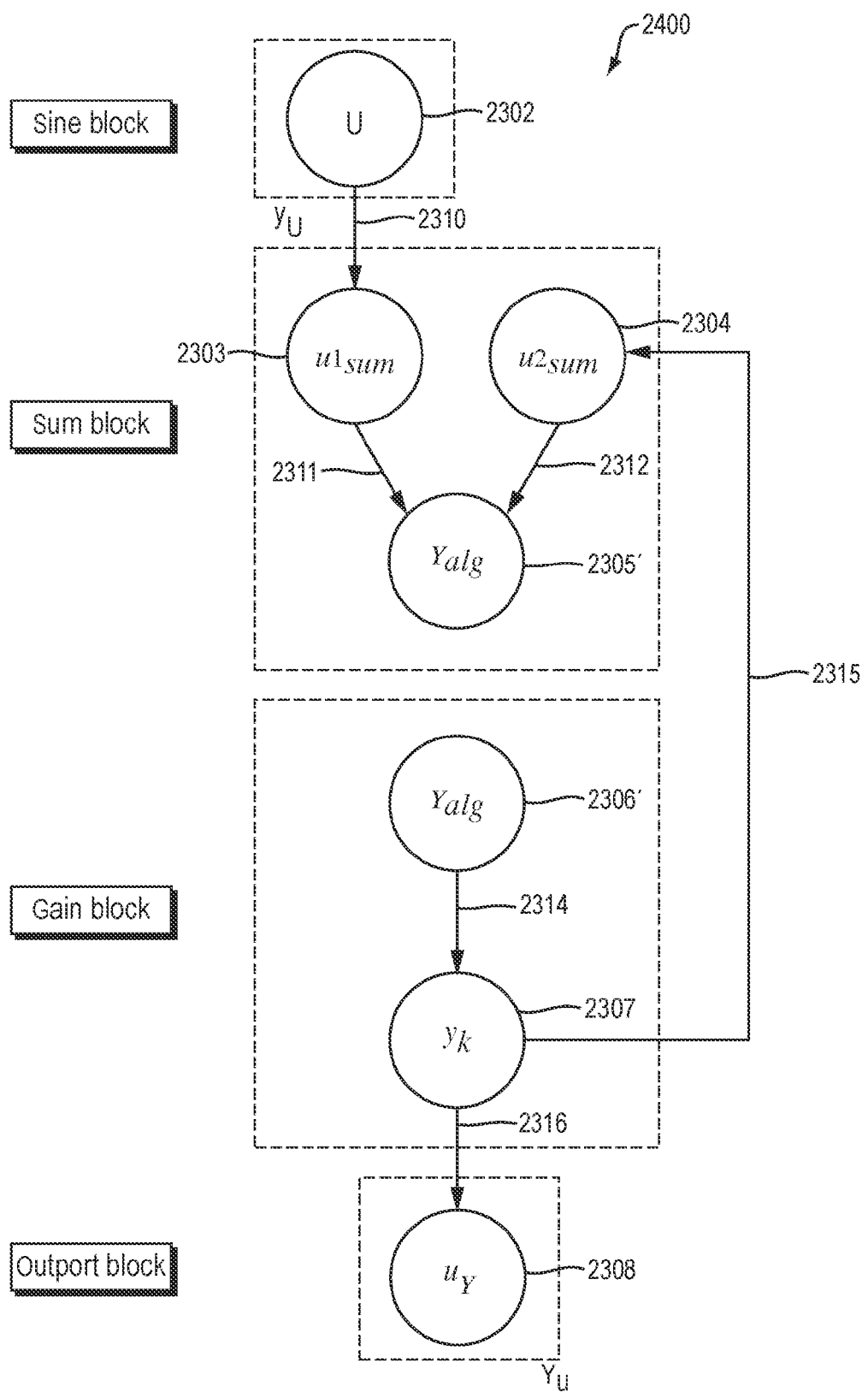
FIG. 24 is an example of an execution graph.

FIG. 24 is an example directed execution graph 2400 of the model 2100 following the assignment of a root level algebraic loop variable $Y_{alg}$ to the variables $y_{sum}$ and $u_k$. As shown, edge 2313 (FIG. 23) is not included in the execution graph 2400, thus cutting or breaking the cycle that had been present. In addition, nodes 2305 and 2306 (FIG. 23) are revised to be associated with the root level algebraic loop variable, $Y_{alg}$, as indicated by revised nodes 2305' and 2306'. As a result, the execution graph 2400 is a DAG.

Returning to FIG. 22, the computation system 120 may proceed as described herein to generate a symbolic algebraic equation for the model from the transformed DAG, if a solution is available, as indicated at step 2208. For example, if a closed form solution is available for this symbolic algebraic equation, it is produced by the system. The system may generate a final solution that does not contain the algebraic loop variable, $Y_{alg}$, as indicated at step 2210. For example, with reference to the model 2100, the system may generate a final solution as follows:

$$u1_{sum} = y_U$$

$$y_U = \sin(T)$$

$$u2_{sum} = y_k$$

$$Y_{alg} = u1_{sum} - u2_{sum}$$

$$y_k = Y_{alg} * k$$

$$u_y = y_k$$

$$Y = u_y$$

$$Y_{alg} = \sin(T) - Y_{alg} \times k$$

(symbolic equation contains $Y_{alg}$)

$$Y = Y_{alg} \times k$$

$$Y_{alg} = \sin(T)/(k+1) \quad Y = \frac{k}{k+1}\sin(T)$$

Final solution if above equations can be solved symbolically.

Additionally, or alternatively, a model may have executable semantics and/or itself may be executable. An executable model may be a time based block diagram. A time based block diagram may consist, for example, of elements connected by lines (e.g., connector lines). The elements may consist of elemental dynamic systems such as a differential equation system (e.g., to specify continuous-time behavior), a difference equation system (e.g., to specify discrete-time behavior), an algebraic equation system (e.g., to specify constraints), etc. The lines may represent signals (e.g., to specify input/output relations between elements or to specify execution dependencies between elements), variables (e.g., to specify information shared between elements), physical connections (e.g., to specify electrical wires, pipes with volume flow, rigid mechanical connections, etc.), etc. The attributes may consist of meta information such as sample times, data dimensions, data complexity (whether there is an imaginary component to a value), data type, etc. associated with the model elements.

In a time based model, ports may be associated with elements. A relationship between two ports may be created by connecting a line (e.g., a connector line) between the two ports. Lines may also, or alternatively, be connected to other lines, for example by creating branch points. For instance, two or more ports can be connected by connecting a line to each of the ports, and by connecting each of the lines to a common branch point for all of the lines. A common branch point for the lines that represent physical connections may be an algebraic or dynamic system (e.g., by summing all variables of a certain type or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between elements may be causal, and may be represented in a directed graph. For example, a model (e.g., a functional model) may include an element that represents a continuous-time integration element that may be causally related to a data logging element by using a line (e.g., a connector line) to connect an output port of the continuous-time integration element to an input port of the data logging element. Further, during execution of the model, the value stored by the continuous-time integrator may change as the current time of the execution progresses. The value of the state of the continuous-time integrator may be available on the output port and the connection with the input port of the data logging element may make this value available to the data logging element.

In an embodiment, connection elements of a model may represent related variables that are shared between two connected elements. The variables may be related such that their combination may represent power. For example, connector lines may represent voltage, current, and/or power, etc. Additionally, or alternatively, the signal flow between elements may be automatically derived.

In some implementations, one or more model elements may operate in accordance with one or more rules or policies corresponding to a model in which they are included. For instance, if the model is intended to behave as an actual, physical system or device, such as an electronic circuit, the elements may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), and/or differential and algebraic equations (DAEs). Requiring models and/or model components to operate in accordance with such rules or policies may, for example, help ensure that simulations based on such models will operate as intended.

A sample time may be associated with the elements of a model. For example, a model may include an element with a continuous sample time such as a continuous-time integration element that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a model may include an element with a discrete sample time such as a unit delay element that may output values of a corresponding input after a specific delay. This delay may be a time interval and this interval may determine a sample time of the element. During execution, the unit delay element may be evaluated each time the execution time has reached a point in time where an output of the unit delay element may change. These points in time may be statically determined based on a scheduling analysis of the model before starting execution.

Alternatively, or additionally, a model may include an element with an asynchronous sample time, such as a zero-crossing element that may schedule a connected element to be evaluated at a non-periodic time. During execution, a zero-crossing element may evaluate an input and when the input attains a specific value when the execution time has reached a point in time, the zero-crossing element may schedule a connected element to be evaluated at this point in time and before advancing execution time.

Further, the values of attributes of a model may be inferred from other elements of the model or other attributes of the model. The inferring may be part of a model compilation. For example, the graphical model may include an element, such as a unit delay element, that may have an attribute that specifies a sample time of the element. When a model has an execution attribute that specifies a fundamental execution period, the sample time of the unit delay element may be inferred from this fundamental execution period.

The values of attributes of a model may be set to characteristic settings, such as one or more inherited settings, one or more default settings, etc. For example, the data type of a variable that is associated with an element may be set to a default such as a double. Because of the default setting, an alternate data type (e.g., a single, an integer, a floating point, etc.) may be inferred based on attributes of elements that the graphical model comprises (e.g., the data type of a variable associated with a connected element) and/or attributes of the graphical model. As another example, the sample time of an element may be set to be inherited. In case of an inherited sample time, a specific sample time may be inferred based on attributes of elements that the graphical model comprises and/or attributes of the graphical model e.g., a fundamental execution period).

The computational programming system 1935 may include a symbolic equation tool and a Graphical User Interface (GUI) for specifying and manipulating symbolic equations. The symbolic equations may be stored as one or more data structures. The symbolic equation tool may provide functions for solving, plotting, and manipulating symbolic equations. One such tool is the Symbolic Math Toolbox™ available from The MathWorks, Inc. The Symbolic Math Toolbox may be used to create, run, and share symbolic math code using the MATLAB® Live Editor (also from The MathWorks, Inc.). This toolbox provides libraries of functions in common mathematical areas such as calculus, linear algebra, algebraic and ordinary differential equations, equation simplification, and equation manipulation. With a symbolic equation tool, such as Symbolic Math Toolbox, a user may perform differentiation, integration, simplification, transforms, and solve equations. Computations may be performed either analytically or using variable precision arithmetic, with the results displayed in mathematical typeset. Symbolic work may be shared as live scripts or converted to HTML or PDF for publication. A user may generate MATLAB functions, Simulink® function blocks, and Simscape™ equations directly from symbolic equations 390 using Symbolic Math Toolbox 370.

A Graphical User Interface (GUI) portion of computational programming system 1935 helps users display, graph, and visualize the behavior of symbolic equations. Symbolic Math Toolbox operates with an equation GUI called the Live Editor (also from The MathWorks, Inc.), which enable handling and operating on symbolic equations. These GUIs are analogous to a notebook concept similar to a word processing system that allows interactive and symbolic formulation of mathematical problems as well as graphic visualization. They let a user document symbolic math derivations with embedded text, graphics, and typeset math in an interactive environment for performing symbolic computations. Results may be displayed in typeset math that can be converted into a typeset language such as MathML, or LaTeX. They provide access to functions in common mathematical areas, such as calculus and linear algebra, and in specialized areas, such as number theory and combinatorics. One can also write custom symbolic functions and libraries use these tools.

A discrete system in some modeling environments, such as the Simulink® modeling environment, may be represented as difference equations. For a discrete system, model elements, such as blocks, may be executed at certain pre-determined times, for example, sample times.

Figure 25:
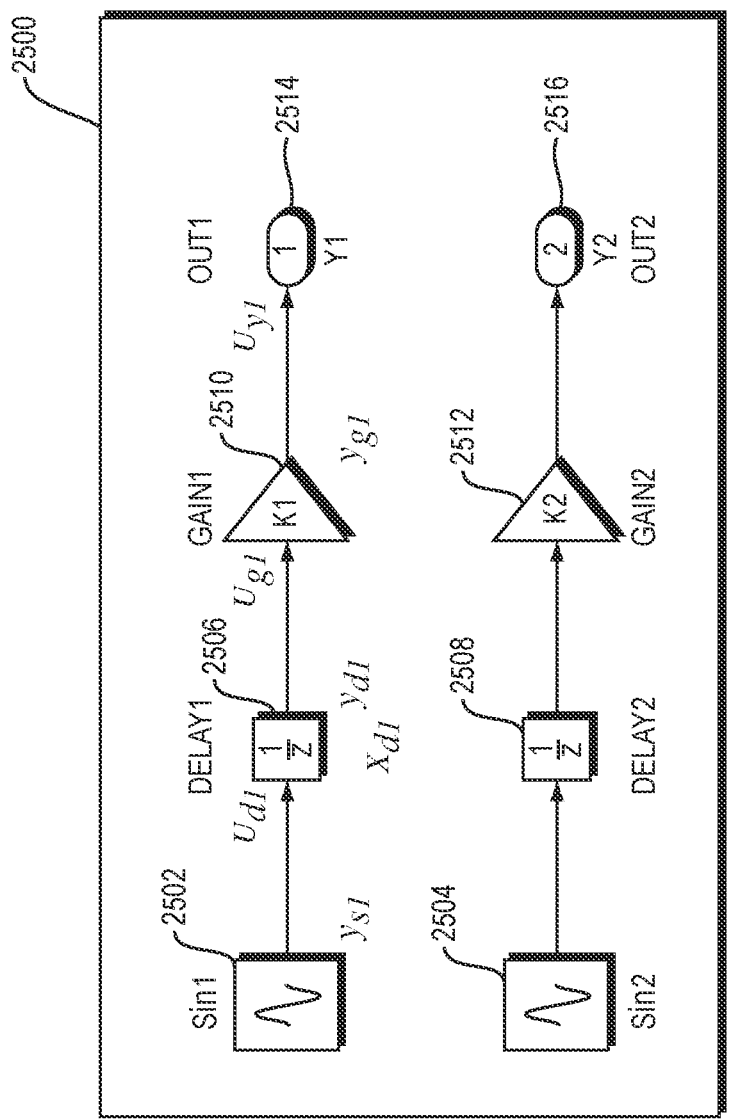
FIG. 25 is an example executable graphical model.

FIG. 25 is an illustration of an example executable graphical model 2500. The model includes two Sine blocks 2502 and 2504 named Sin1 and Sin2, respectively, two Delay blocks 2506 and 2508, which may be Unit Delay blocks, named Delay1 and Delay2, respectively, two Gain blocks 2510 and 2512, named GAin1 and Gain2, respectively, and two Outport blocks 2514 and 2516, named Out1 and Out2, respectively. The model 2500 may contain two sample time Ts = 0.1 second and Ts = 0.2 second. The blocks 2502, 2506, 2510, and 2514 of the model 2500 may have sample time Ts = 0.1, and may be executed at $t_k = 0.1 \times k$, where k = 0, 1, 2, ... n. In some embodiments, these blocks 2502, 2506, 2510, and 2514 may be presented using one graphical affordance, e.g., the color red. The blocks 2504, 2508, 2512, and 2516 of the model 2500 may have sample Ts time = 0.2, and may be executed at $t_j = 0.1 \times j$, where j = 0, 1, 2, ... m. In some embodiments, these blocks 2504, 2508, 2512, and 2516 may be presented using another graphical affordance, e.g., the color green.

For discrete systems, symbolic equations of the model may include an output method and an update method. The output method may calculate the output value of the system at $t_k$ and the update method may calculate the value of the state at $t_{k+1}$.

Equations corresponding to different sample times may be extracted separately. The steps to extract discrete symbolic equations may be similar to the steps to extract symbolic equations for a continuous time system, as described. For example, first, the execution graph of one particular sample time may be created. Then, the equations of each block and the connections among blocks may be created. Finally the symbolic engine may simplify the equations, remove temporary equations, and produce the final results.

The extraction of equations for blocks 2502, 2506, 2510, and 2514 of the model 2500 may proceed as follows:

$$y_{s1}(t_k) = \sin(t_k)$$

output method of sine block Sin1

$$u_{d1}(t_k) = y_{s1}(t_k)$$

connection between Sin1 and unit delay block Delay1

$$y_{d1}(t_k) = X_{d1}(t_k)$$

output method of unit delay block Delay 1

$$u_{g1}(t_k) = y_{d1}(t_k)$$

connection between unit delay block Delay1 and gain block Gain1

$$y_{g1}(t_k) = K_1 \times u_{g1}(t_k)$$

output of gain block Gain1

$$u_{y1}(t_k) = y_{g1}(t_k)$$

connection between gain block Gain1 and root output block Y1

$$Y_1(t_k) = u_{y1}(t_k)$$

output of root output block Y1

$$X_{d1}(t_{k+1}) = u_{d1}(k)$$

update of unit delay block Delay1

The above equations may be simplified by the symbolic engine to:

$$Y_1(t_k) = K_1 \times X_{d1}(t_k)$$

Model output in symbolic form $$X_{d1}(t_{k+1}) = sin(t_k)$$

Update of unit delay block Delay1 Or in combined form:

$$Y_1(t_k) = K_1 \times sin(t_{k-1})$$

In some embodiments, the same process may be performed to extract equations for blocks 2504, 2508, 2512, and 2516 of the model 2500.

Although the drawings herein show example components of modeling system 1930 and computational system 1935, in other implementations, modeling system 110 and computational system 1935 may include fewer components, different components, differently arranged components, or additional components than depicted. Additionally or alternatively, one or more components of modeling system 1930 and/or computational programming system 1935 may perform one or more tasks described as being performed by one or more other components of modeling system 1930 and/or computational system 1935.

10. Conclusion

The foregoing description of example embodiments provides illustration and description of systems and methods for presenting symbolic equations that correspond to graphical models, but is not intended to be exhaustive or to be limited to the precise form disclosed. Modifications and variations are possible in light of the above teachings. For example, while a series of acts has been described above with respect to the flow diagrams, the order of the acts may be modified in other implementations. In addition, the acts, operations, and steps may be performed by additional or other modules or entities, which may be combined or separated to form other modules or entities. For example, while a series of acts has been described with regard to FIGS. 7 and 15, the order of the acts may be modified in other implementations consistent with the principles of the invention. Further, non-dependent acts may be performed in parallel. Further, disclosed implementations may not be limited to any specific combination of hardware.

Certain portions may be implemented as "logic" that performs one or more functions. This logic may include hardware, such as hardwired logic, an application-specific integrated circuit, a field programmable gate array, a microprocessor, software, wetware, or a combination of hardware and software. Some or all of the logic may be stored in one or more tangible non-transitory computer-readable storage media and may include computer-executable instructions that may be executed by a computer or data processing system. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Headings and/or subheadings herein are used to segment this patent application into portions to facilitate the readability of the application. These headings and/or subheadings are not intended to define or limit the scope of what is disclosed and/or claimed in this patent application.

Also, the term "user", as used herein, is intended to be broadly interpreted to include, for example, a computer or data processing system or a human user of a computer or data processing system, unless otherwise stated.

The foregoing description has been directed to specific embodiments of the present disclosure. It will thus be apparent, however, that other variations and modifications may be made to the described embodiments, with the attainment of some or all of their advantages. Therefore, it is the object of the appended claims to cover all such variations and modifications as come within the true spirit and scope of the disclosure and their equivalents.

The invention claimed is:

1. A computer implemented method for interactively displaying symbolic equations representative of an executable graphical model comprising:

accessing, from a memory, by one or more processors, the executable graphical model including a plurality of variables and a plurality of model elements interconnected by a plurality of connections, wherein the executable graphical model executes over a plurality of execution stages and the executable graphical model, with the plurality of variables and the plurality of model elements interconnected by the plurality of connections, is displayed on a display screen;

determining, by the one or more processors and based on an analysis of the executable graphical model, a mathematical operation performed between at least two variables of the plurality of variables that are displayable with the executable graphical model, wherein the determining is for an execution stage of the plurality of execution stages, and wherein the mathematical operation is a type of mathematical operation of a plurality of different types of mathematical operations;

generating, by the one or more processors, at least one symbolic equation that is representative of one or more portions of the executable graphical model, where the at least one symbolic equation includes the at least two variables and the mathematical operation performed between the at least two variables;

displaying, by the one or more processors and on the display screen, (1) the at least one symbolic equation with the at least two variables and the mathematical operation, and (2) the executable graphical model with the at least two variables;

accepting an input, by the one or more processors, indicating a change in the executable graphical model;

automatically generating, by the one or more processors and in response to the change in the executable graphical model, at least one updated symbolic equation; and updating, by the one or more processors and on the display screen, the executable graphical model and the at least one symbolic equation including the at least one updated symbolic equation.

2. The method of claim 1 wherein the change in the executable graphical model is a change in at least one attribute of the executable graphical model, or a change in a selected connection between selected elements of the executable graphical model, or addition or removal of a particular element of the executable graphical model.

3. The method of claim 1 further comprising:
generating, by the one or more processors, an intermediate representation of the executable graphical model, the intermediate representation comprising a directed graph including nodes representing the plurality of variables and graph connections representing relationships between the plurality of variables; and
wherein the at least one symbolic equation is generated from the intermediate representation.

4. The method of claim 3 wherein the executable graphical model comprises at least one of attribute that is a sample time, the method further comprising:
propagating the sample time as a property of at least one variable, of the plurality of variables, in one or more corresponding symbolic equations.

5. The method of claim 1 further comprising:
determining, by the one or more processors and based on an analysis of the executable graphical model, one or more different types of runtime semantics for at least one model element of the plurality of model elements, wherein the one or more different types of runtime semantics comprise one or more of an output method, an update method, a derivative method, an enable method, a disable method, or a zero crossing method.

6. The method of claim 1 wherein the executable graphical model comprises an algorithmic function or a coded function represented with a function label in the at least one symbolic equation.

7. The method of claim 1 further comprising:
accepting, by the one or more processors, an input indicating a user interaction with a selected portion of the executable graphical model that is displayed on the display screen; and
indicating, by the one or more processors and on the display screen, a corresponding portion of the at least one symbolic equation.

8. The method of claim 7 wherein the user interaction results in displaying, by the one or more processors, the selected portion of the executable graphical model in a certain color, and displaying the corresponding portion of the at least symbolic equation in the certain color.

9. The method of claim 1 further comprising:
accepting by the one or more processors, user input resulting in only a selected portion of the executable graphical model being displayed; and
automatically displaying, by the one or more processors, only a corresponding portion of the at least one symbolic equation with the selected portion of the executable graphical model.

10. The method of claim 9 wherein a detail level of the corresponding portion of the at least one symbolic equation is defined by the user explicitly or implicitly.

11. The method of claim 1 further comprising:
accepting by the one or more processors, user input resulting in only a selected portion of the at least one symbolic equation being displayed; and
automatically displaying, by the one or more processors, only a corresponding portion of the executable graphical model with the selected portion of the at least one symbolic equation.

12. The method of claim 1 wherein generating the at least one symbolic equation further comprises:
determining, by the one or more processors, a simplified form for the at least one symbolic equation.

13. The method of claim 12 wherein the simplified form is generated, by the one or more processors, utilizing one or more of symbolic variable cancellation, temporary variable removal, or symbolic variable substitution.

14. The method of claim 3 further comprising:
determining by the one or more processors, a simplified form for the intermediate representation using a graph reduction method.

15. The method of claim 1 further comprising:
indicating, by the one or more processors and on the display screen, portions of the executable graphical model for which particular symbolic equations could not be generated.

16. The method of claim 1 wherein the executable graphical model specifies sampling rates for the elements, and a corresponding sampling rate for one or more variables in the at least one symbolic equation is visually indicated on either or both of the executable graphical model and the at least one symbolic equation displayed on the display screen.

17. The method of claim 16 wherein a first color indicates a discrete time variable and a second color indicates a continuous time variable.

18. The method of claim 1 wherein at least one model element comprises an initial value method expressed as a subgraph.

19. The method of claim 3 further comprising:
detecting an occurrence of a loop in the intermediate representation of the executable graphical model; and
cutting at least one edge of the intermediate representation to break the loop.

20. The method of claim 19 wherein the at least one edge of the intermediate representation links to a node associated with a temporary variable, and further wherein the cutting includes replacing the temporary variable associated with the node with a root level variable.

21. A device comprising one or more processors to:
obtain a graphical model of a system including a plurality of variables and a plurality of model elements interconnected by a plurality of connections, wherein the graphical model executes over a plurality of execution stages and the graphical model, with the plurality of variables and the plurality of model elements interconnected by the plurality of connections, is displayed on a display screen;
determine, based on an analysis of the graphical model, a mathematical operation performed between at least two variables of the plurality of variables that are displayable with the graphical model, wherein the determining is for an execution stage of the plurality of execution stages;
generate at least one symbolic equation representative of one or more portions of the graphical model, where the at least one symbolic equation includes the at least two variables and the mathematical operation performed between the at least two variables;
display, on the display screen, (1) the at least one symbolic equation with the at least two variables and the mathematical operation and, (2) the graphical model with the at least two variables;
accept an input indicating a change in the graphical model;
automatically generate at least one updated symbolic equation based on the change in the graphical model; and update, on the display screen, the graphical model and the at least one symbolic equation including the at least one updated symbolic equation.

22. A non-transitory computer-readable medium storing program code, the program code comprising one or more instructions that, when executed by one or more processors, cause the one or more processors to:
obtain a graphical model of a system including a plurality of variables and a plurality of model elements interconnected by a plurality of connections, wherein the graphical model executes over a plurality of execution stages and the graphical model, with the plurality of variables and the plurality of model elements interconnected by the plurality of connections, is displayed on a display screen;
determine, based on an analysis of the graphical model, a mathematical operation performed between at least two variables of the plurality of variables that are displayable with the graphical model;
generate at last one symbolic equation representative of one or more portions of the graphical model, where the at least one symbolic equation includes the at least two variables and the mathematical operation performed between the at least two variables;
display, on a display screen, (1) the at least one symbolic equation with the at least two variables and the mathematical operation, and (2) the graphical model with the at least two variables;
accept an input indicating a change in the graphical model;
automatically generate at least one updated symbolic equation based on the change in the graphical model; and
update, on the display screen, the graphical model and the at least one symbolic equation including the at least one updated symbolic equation.

23. The method of claim 1 wherein the at least one symbolic equation includes a first symbolic equation generated for the at least one model element, the method further comprising:
selecting a particular variable for the first symbolic equation based on one or more different types of runtime semantics determined for the at least one model element.

24. The method of claim 1 further comprising:
displaying the at least one symbolic equation with the at least two variables and the mathematical operation in a first window on the display screen;
displaying the executable graphical model with the at least two variables in a second window on the display screen.

25. The method of claim 24 wherein the first window and the second window are different windows.

* * * * *

UNITED STATES PATENT AND TRADEMARK OFFICE
CERTIFICATE OF CORRECTION

PATENT NO. : 11,762,943 B1  
APPLICATION NO. : 15/716112  
DATED : September 19, 2023  
INVENTOR(S) : Fu Zhang et al.

Page 1 of 1

It is certified that error appears in the above-identified patent and that said Letters Patent is hereby corrected as shown below:

In the Specification

Column 11, Line 15 reads:  
"indicates a zerocrossing variable. The exact type of methods"  
Should read:  
--indicates a zero crossing variable. The exact type of methods--

Column 17, Line 21 reads:  
"node xldot."  
Should read:  
--node x1dot.--

Signed and Sealed this  
Tenth Day of February, 2026

John A. Squires  
*Director of the United States Patent and Trademark Office*